US012611863B2

(12) United States Patent
Nakayama

(10) Patent No.: US 12,611,863 B2
(45) Date of Patent: Apr. 28, 2026

(54) LIQUID EJECTION HEAD CHIP, LIQUID JET HEAD, AND LIQUID JET RECORDING DEVICE FOR EJECTING LIQUID

(71) Applicant: SII Printek Inc., Chiba (JP)

(72) Inventor: Hitoshi Nakayama, Chiba (JP)

(73) Assignee: SII PRINTEK, INC., Chiba (JP)

( * ) Notice: Subject to any disclaimer, the term of this patent is extended or adjusted under 35 U.S.C. 154(b) by 222 days.

(21) Appl. No.: 18/536,714

(22) Filed: Dec. 12, 2023

(65) Prior Publication Data

US 2024/0198674 A1 Jun. 20, 2024

(30) Foreign Application Priority Data

Dec. 16, 2022 (JP) ................................ 2022-201235

(51) Int. Cl.
*B41J 2/14* (2006.01)
*B41J 2/16* (2006.01)

(52) U.S. Cl.
CPC ........... *B41J 2/1433* (2013.01); *B41J 2/1623* (2013.01); *B41J 2002/14491* (2013.01)

(58) Field of Classification Search
CPC .................... B41J 2/1433; B41J 2/1623; B41J 2002/14491; B41J 2/1609; B41J 2/1632; B41J 2/1643; B41J 2/1646; B41J 2002/14362; B41J 2202/12; B41J 2/14209; B41J 2/14032; B41J 2/17546
See application file for complete search history.

(56) References Cited

FOREIGN PATENT DOCUMENTS

| | | | |
|---|---|---|---|
| JP | 2015-196145 A | | 11/2015 |
| JP | 2016068537 A | * | 5/2016 |

OTHER PUBLICATIONS

Search Report in European Application No. 23216461.6, dated Apr. 26, 2024 (29 pages).

* cited by examiner

*Primary Examiner* — Bradley W Thies
(74) *Attorney, Agent, or Firm* — Crowell & Moring LLP

(57) ABSTRACT

Head chips, liquid jet heads, and liquid jet recording devices capable of effectively transferring the elastic energy to ink in ejection channels to obtain desired ejection performance are provided. A head chip includes an actuator plate in which jet channels and non-jet channels are alternately arranged, a side-surface common electrode formed on inner side surfaces opposed to each other in a second direction out of inner surfaces of the jet channel, a bottom-surface common electrode formed on a bottom surface facing to a first side in a thickness direction out of the inner surfaces of the jet channel, a first individual electrode formed on inner side surfaces opposed to each other in the second direction out of inner surfaces of the non-jet channel, and a second individual electrode disposed on an opposite surface facing to a second side in the thickness direction out of the actuator plate.

7 Claims, 27 Drawing Sheets

LIQUID EJECTION HEAD CHIP, LIQUID JET HEAD, AND LIQUID JET RECORDING DEVICE FOR EJECTING LIQUID

RELATED APPLICATIONS

This application claims priority to Japanese Patent application No. JP2022-201235 filed on Dec. 16, 2022, the entire content of which is incorporated herein by reference.

BACKGROUND OF THE INVENTION

1. Field of the Invention

The present disclosure relates to a head chip, a liquid jet head, and a liquid jet recording device.

2. Description of the Related Art

A head chip to be installed in an inkjet printer is provided with an actuator plate provided with ejection channels and non-ejection channels, and a nozzle plate having nozzle holes communicated with the ejection channels. The ejection channels and the non-ejection channels are alternately arranged across respective drive walls (see, e.g., JP2015-196145A).

In the head chip, in order to eject ink, a voltage is applied between electrodes provided to the drive walls to generate an electric field in the drive walls. Thus, a shear deformation (a thickness-shear deformation) occurs in the drive walls in a shear mode (a wall-bend type) to thereby change the volume of an inside of the ejection channel. As a result, the ink in the ejection channel is ejected through the nozzle hole.

However, in the related art, a room for improvement still exists in the point of increasing pressure to be generated in the ejection channel when ejecting the ink. In the related art, in particular when attempting to increase the width of the ejection channel while keeping the width of the drive walls, and so on, it is difficult to effectively transfer elastic energy to the ink located in the ejection channel, and thus, it is difficult to obtain the desired pressure to be generated.

The present disclosure provides a head chip, a liquid jet head, and a liquid jet recording device each capable of effectively transferring the elastic energy to the ink in the ejection channel to obtain a desired ejection performance.

SUMMARY OF THE INVENTION

In order to solve the problems described above, the present disclosure adopts the following aspects.

(1) A head chip according to an aspect of the present disclosure includes an actuator plate in which jet channels and non-jet channels opening at a first side in a thickness direction and extending in a first direction crossing the thickness direction are alternately arranged in a second direction crossing the first direction when viewed from the thickness direction, a side-surface common electrode formed on inner side surfaces opposed to each other in the second direction out of inner surfaces of the jet channel, a bottom-surface common electrode formed on a bottom surface facing to the first side in the thickness direction out of the inner surfaces of the jet channel, a first individual electrode which is formed on inner side surfaces opposed to each other in the second direction out of inner surfaces of the non-jet channel, and which is configured to generate a potential difference from the side-surface common electrode, and a second individual electrode which is disposed on an opposite surface facing to a second side in the thickness direction out of the actuator plate, and which is configured to generate a potential difference from the bottom-surface common electrode.

According to the present aspect, by generating the potential difference in the second direction between the side-surface common electrode and the first individual electrode, it is possible to deform the actuator plate in the second direction in the shear mode. Further, by generating the potential difference in the thickness direction between the bottom-surface electrode and the second individual electrode, it is possible to deform the actuator plate in the thickness direction in the bend mode. As described above, by deforming the actuator plate in both of the second direction and the thickness direction, it is easy to ensure the elastic energy of the actuator plate when applying the voltage. Therefore, even when ensuring the width of the channels, it is easy to effectively transfer the elastic energy to the liquid located inside the jet channel to ensure the pressure generated in the jet channel when jetting the liquid. As a result, it is possible to obtain a desired jet performance. In this case, by ensuring the width of the channels, it is easy to introduce the electrode material into the channels through the opening parts of the channels when forming the electrode material on the inner surfaces of the channels with oblique evaporation. Therefore, it is possible to achieve an increase in manufacturing efficiency and yield ratio.

(2) In the head chip according to the aspect (1) described above, it is preferable that the non-jet channel penetrates the actuator plate in the thickness direction, and the first individual electrode is formed throughout an entire area in the thickness direction on the inner side surfaces of the non-jet channel.

According to the present aspect, it is possible to generate the potential difference between the portion of the first individual electrode, the portion being located at the second side of the bottom surface of the jet channel, and the bottom-surface electrode. Therefore, it is possible to more effectively deform the actuator plate in a direction in which the volume of the jet channel increases or decreases. Thus, it is possible to achieve a further increase in pressure generated in the jet channel when ejecting the liquid.

(3) In the head chip according to the aspect (2) described above, it is preferable that a coupling interconnection configured to couple the first individual electrode and the second individual electrode to each other is formed on the opposite surface.

According to the present aspect, by coupling the first individual electrode and the second individual electrode to each other on the opposite surface of the actuator plate, it becomes possible to couple the first individual electrode and the second individual electrode in a lump to an external interconnection. Thus, it is possible to prevent a complication of the configuration due to the addition of the second individual electrode.

(4) In the head chip according to any one of the aspects (1) through (3) described above, it is preferable that a jet hole plate having jet holes respectively communicated with the jet channels is overlapped on a first side end surface in the first direction in the actuator plate.

According to the present aspect, it becomes possible to reduce the size of the outer shape of the head chip viewed from the first direction while ensuring the length of the channels.

(5) In the head chip according to any one of the aspects (1) through (3) described above, it is preferable that a cover plate having an entrance flow channel communicated with the jet channel in a first side end portion in the first direction, and an exit flow channel communicated with the jet channel in a second side end portion in the first direction is disposed at the second side in the thickness direction with respect to the actuator plate, and a jet hole plate provided with a jet hole communicated with the jet channel is disposed at the first side in the thickness direction with respect to the actuator plate.

According to the present aspect, by circulating the liquid through the entrance flow channel, the jet channel, and the exit flow channel, it is possible to ensure the flow rate of the liquid flowing through the jet channel. On that basis, in the present aspect, since it is possible to increase ejection pressure as described above, it is possible to ensure the jet amount of the liquid to increase the printing efficiency.

(6) A liquid jet head according to the present disclosure includes the head chip according to any one of the aspects (1) through (5) described above.

According to the present aspect, since the head chip according to the aspect described above is provided, it is possible to provide the liquid jet head which is capable of exerting the desired jet performance, and which is high in quality.

(7) A liquid jet recording device according to an aspect of the present disclosure includes the liquid jet head according to the aspect (6) described above.

According to the present aspect, since the liquid jet head according to the aspect described above is provided, it is possible to provide the liquid jet recording device which is capable of exerting the desired jet performance, and which is high in quality.

According to an aspect of the present disclosure, it is possible to effectively transfer the elastic energy to the liquid located in the jet channel to obtain the desired jet performance.

DETAILED DESCRIPTION OF THE PREFERRED EMBODIMENTS

Figure 1:
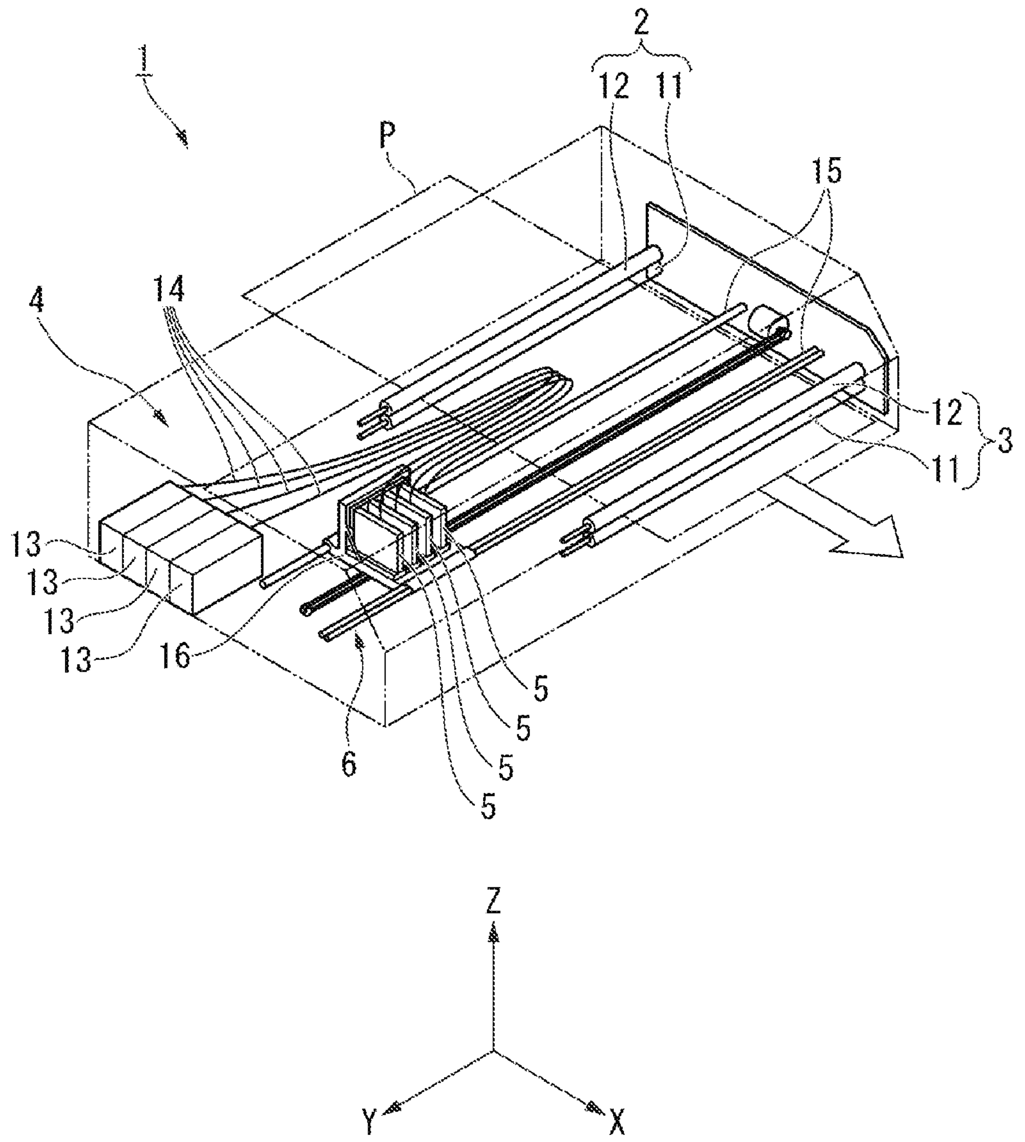
FIG. 1 is a schematic configuration diagram of an inkjet printer according to a first embodiment.

Some embodiments according to the present disclosure will hereinafter be described with reference to the drawings. In the embodiments and modified examples hereinafter described, constituents corresponding to each other are denoted by the same reference symbols, and the description thereof will be omitted in some cases. In the following description, expressions representing relative or absolute arrangements such as "parallel," "perpendicular," "central," and "coaxial" not only represent strictly such arrangements, but also represent the state of being relatively displaced with a tolerance, or an angle or a distance to the extent that the same function can be obtained. In the following embodiment, the description will be presented citing an inkjet printer (hereinafter simply referred to as a printer) for performing recording on a recording target medium using ink (a liquid) as an example. The scale size of each member is arbitrarily modified so as to provide a recognizable size to the member in the drawings used in the following description.

First Embodiment

[Printer 1]

FIG. 1 is a schematic configuration diagram of a printer 1.

The printer (a liquid jet recording device) 1 shown in FIG. 1 is provided with a pair of conveying mechanisms 2, 3, an ink supply mechanism 4, inkjet heads (liquid jet heads) 5, and a scanning mechanism 6.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 6. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink supply mechanism 4 is provided with ink tanks 13 each containing the ink, and ink pipes 14 for respectively connecting the ink tanks 13 and the inkjet heads 5 to each other. The ink tanks 13 respectively contain four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink according to the ink tanks 13 coupled thereto.

The scanning mechanism 6 makes the inkjet heads 5 perform a reciprocal scan in the Y direction. The scanning mechanism 6 is provided with a guide rail 15 extending in the Y direction, and a carriage 16 movably supported by the guide rail 15. In the illustrated example, the plurality of inkjet heads 5 is mounted on the single carriage 16 so as to be arranged side by side in the Y direction.

<Inkjet Heads 5>

The inkjet heads 5 are mounted on the carriage 16. In the illustrated example, the plurality of inkjet heads 5 is mounted on the single carriage 16 so as to be arranged side by side in the Y direction. The inkjet heads 5 are each provided with a head chip 50 (see FIG. 3), an ink supply section (not shown) for coupling the ink supply mechanism 4 and the head chip 50 to each other, and a control section (not shown) for applying drive voltages to the head chip 50.

<Head Chip 50>

Figure 2:
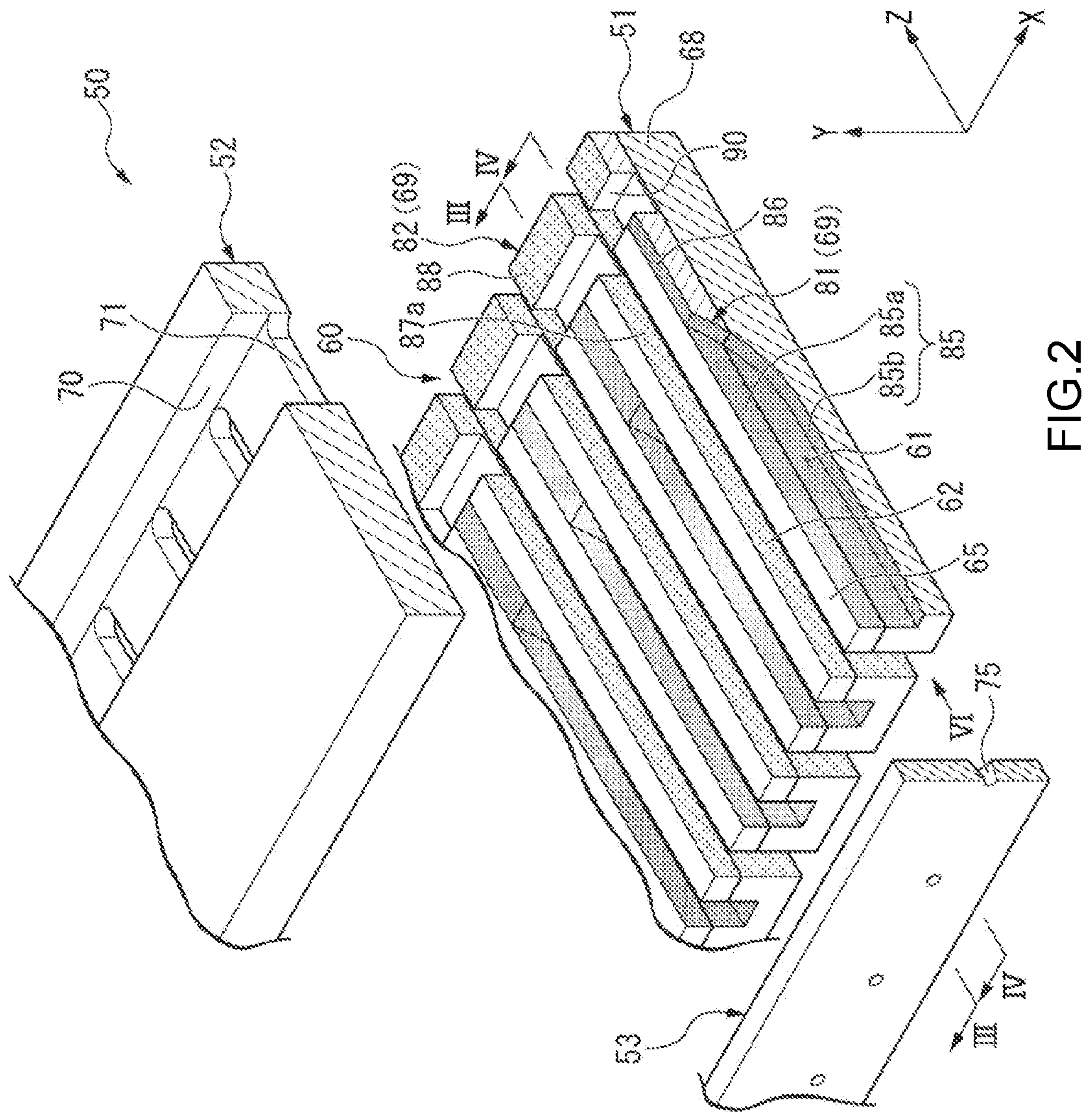
FIG. 2 is an exploded perspective view of a head chip according to the first embodiment.

FIG. 2 is an exploded perspective view of the head chip 50.

The head chip 50 shown in FIG. 2 is of a so-called edge-shoot type for ejecting the ink from an end portion in an extending direction (the Z direction) in ejection channels 61 described later. Specifically, the head chip 50 is provided with an actuator plate 51, a cover plate 52, and a nozzle plate 53.

The actuator plate 51 is formed of a piezoelectric material such as PZT (lead zirconate titanate). The actuator plate 51 has a configuration (a so-called chevron substrate) in which two piezoelectric plates having respective polarization directions in the Y direction (a thickness direction) different from (opposed to) each other are stacked. It should be noted that it is possible to adopt a configuration in which the polarization direction of the actuator plate 51 is uniform in the entire length in the Y direction (a so-called monopole substrate).

The actuator plate 51 is provided with the ejection channels (jet channels) 61 each filled with the ink, and non-ejection channels (non-jet channels) 62 not filled with the ink. The channels 61, 62 are alternately arranged at intervals in the X direction (a second direction) in the actuator plate 51 to thereby form a channel array 60. The configuration in which the channel extension direction coincides with the Z direction (a first direction) will be described in the first embodiment, but the channel extension direction can cross the Z direction.

Figure 3:
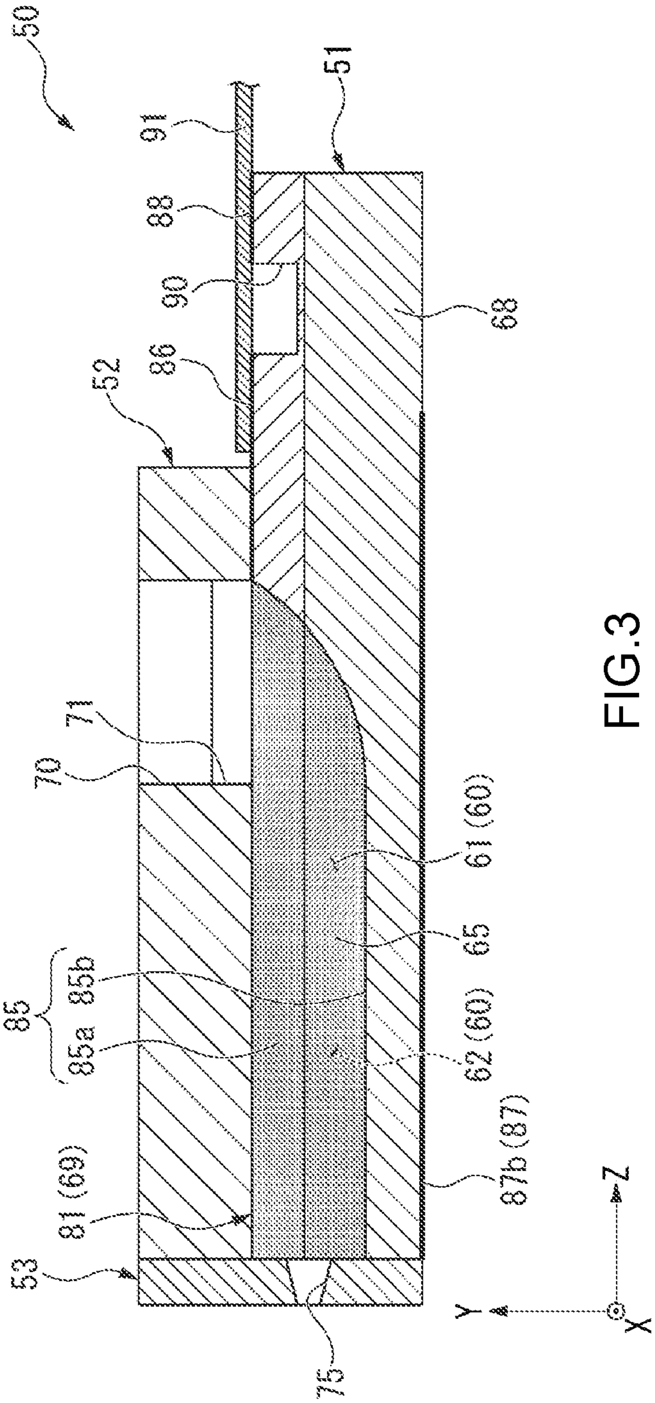
FIG. 3 is a cross-sectional view of the head chip corresponding to the line III-III shown in FIG. 2.

FIG. 3 is a cross-sectional view of the head chip 50 corresponding to the line III-III shown in FIG. 2. In the following explanation, the description will be presented defining the +Y side as an obverse surface side, the −Y side as a reverse surface side, the +Z side as an upper side, and the −Z side as a lower side.

As shown in FIG. 3, the ejection channel 61 opens on the obverse surface of the actuator plate 51, and at the same time, extends in the Z direction. An upper end portion of the ejection channel 61 gradually shallows in depth in the Y direction along an upward direction.

Figure 4:
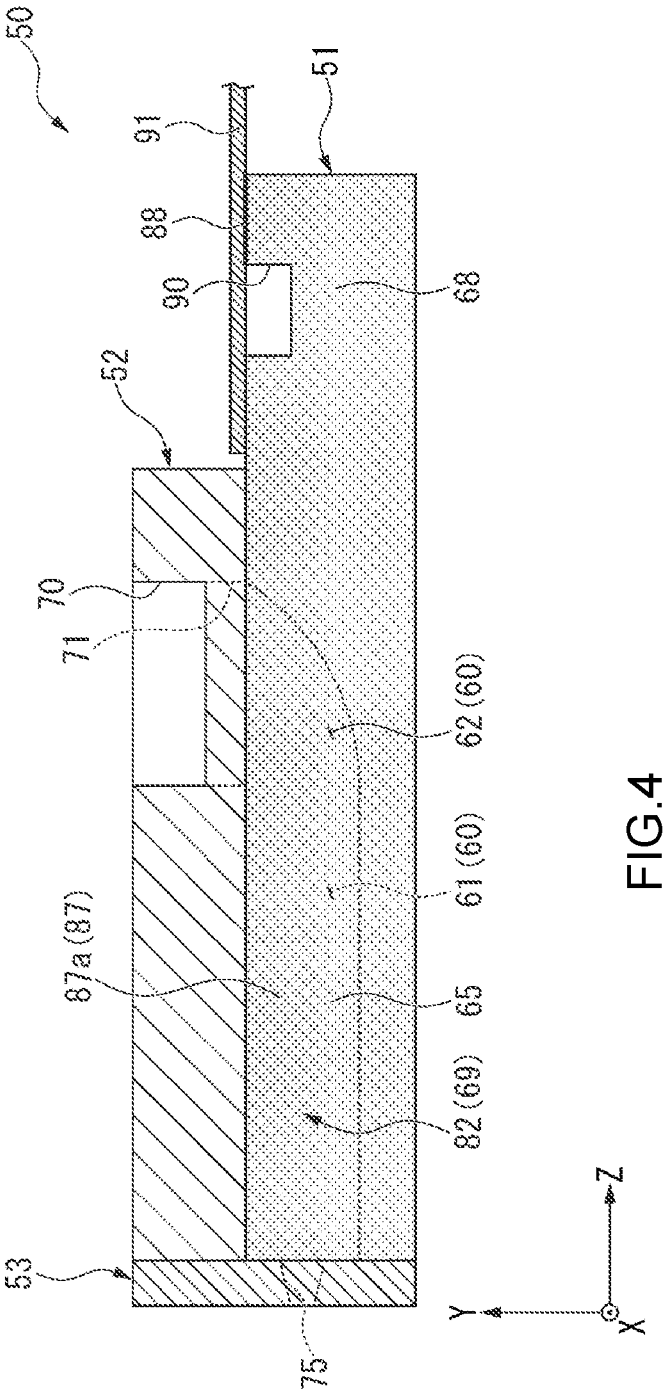
FIG. 4 is a cross-sectional view of the head chip corresponding to the line IV-IV shown in FIG. 2.

FIG. 4 is a cross-sectional view of the head chip 50 corresponding to the line IV-IV shown in FIG. 2.

As shown in FIG. 4, the non-ejection channel 62 opens on the obverse surface of the actuator plate 51, and at the same time, penetrates the actuator plate 51 in the Z direction. The depth in the Y direction in the non-ejection channel 62 is uniform throughout the entire length in the Z direction. The non-ejection channel 62 penetrates the actuator plate 51 in the Y direction.

As shown in FIG. 2, in the actuator plate 51, a portion located between each of the ejection channels 61 and corresponding one of the non-jet channels 62 constitutes a drive wall 65. Therefore, both sides in the X direction of the ejection channel 61 are surrounded by the pair of drive walls 65. In the actuator plate 51, a portion located above the ejection channel 61 constitutes a tail part 68. It should be noted that a back plate which closes a reverse surface-side opening part of the non-ejection channel 62 can be disposed on a reverse surface of the actuator plate 51.

The actuator plate 51 is provided with drive interconnections 69. The drive interconnections 69 are formed by depositing an electrode material such as Ti/Au or Ni/Au using, for example, evaporation, sputtering, or plating. The details of the drive interconnections 69 will be described later.

<Cover Plate 52>

As shown in FIG. 2 through FIG. 4, the cover plate 52 is overlapped on the obverse surface of the actuator plate 51. Specifically, the cover plate 52 closes the obverse surface-side opening parts of the respective channels 61, 62 in a state of exposing the obverse surface of the tail part 68. The cover plate 52 is bonded to the obverse surface of the actuator plate 51. A lower end surface of the cover plate 52 is arranged coplanar with the lower end surface of the actuator plate 51.

In the cover plate 52, at a position overlapping the upper end portion of the ejection channel 61 when viewed from the Y direction, there is formed a common ink chamber 70. The common ink chamber 70 extends in the X direction with a length sufficient for straddling, for example, the channel array 60, and at the same time, opens on the obverse surface of the cover plate 52.

In the common ink chamber 70, at the positions overlapping the respective ejection channels 61 when viewed from the Y direction, there are formed slits 71. The slits 71 each communicate the upper end portion of corresponding one of the ejection channels 61 and the inside of the common ink chamber 70 with each other. Therefore, the common ink chamber 70 is communicated with the ejection channels 61 through the respective slits 71 on the one hand, but is not communicated with the non-ejection channels 62 on the other hand.

<Nozzle Plate 53>

The nozzle plate 53 is bonded to a lower end surface of the actuator plate 51. The nozzle plate 53 is arranged with the thickness direction set to the Z direction. In the first embodiment, the nozzle plate 53 is formed of a metal material (SUS, Ni—Pd, and so on) so as to have a thickness of about 50 μm. It should be noted that it is possible for the nozzle plate 53 to have a single layer structure or a laminate structure with a resin material such as polyimide, glass, silicone, or the like besides the metal material. It is sufficient for the nozzle plate 53 to directly be fixed to the lower end surface of the actuator plate 51, or to indirectly be fixed via, for example, an intermediate plate.

The nozzle plate 53 is provided with nozzle holes 75 penetrating the nozzle plate 53 in the Z direction. The nozzle holes 75 are formed separately from each other at positions opposed in the Z direction to the respective ejection channels 61 in the nozzle plate 53. It should be noted that each of the nozzle holes 75 is formed to have a taper shape gradually tapering along a direction from the upper side toward the lower side.

Subsequently, a structure of the drive interconnections 69 will be described.

The drive interconnections 69 consist of common interconnections 81 and individual interconnections 82.

Figure 5:
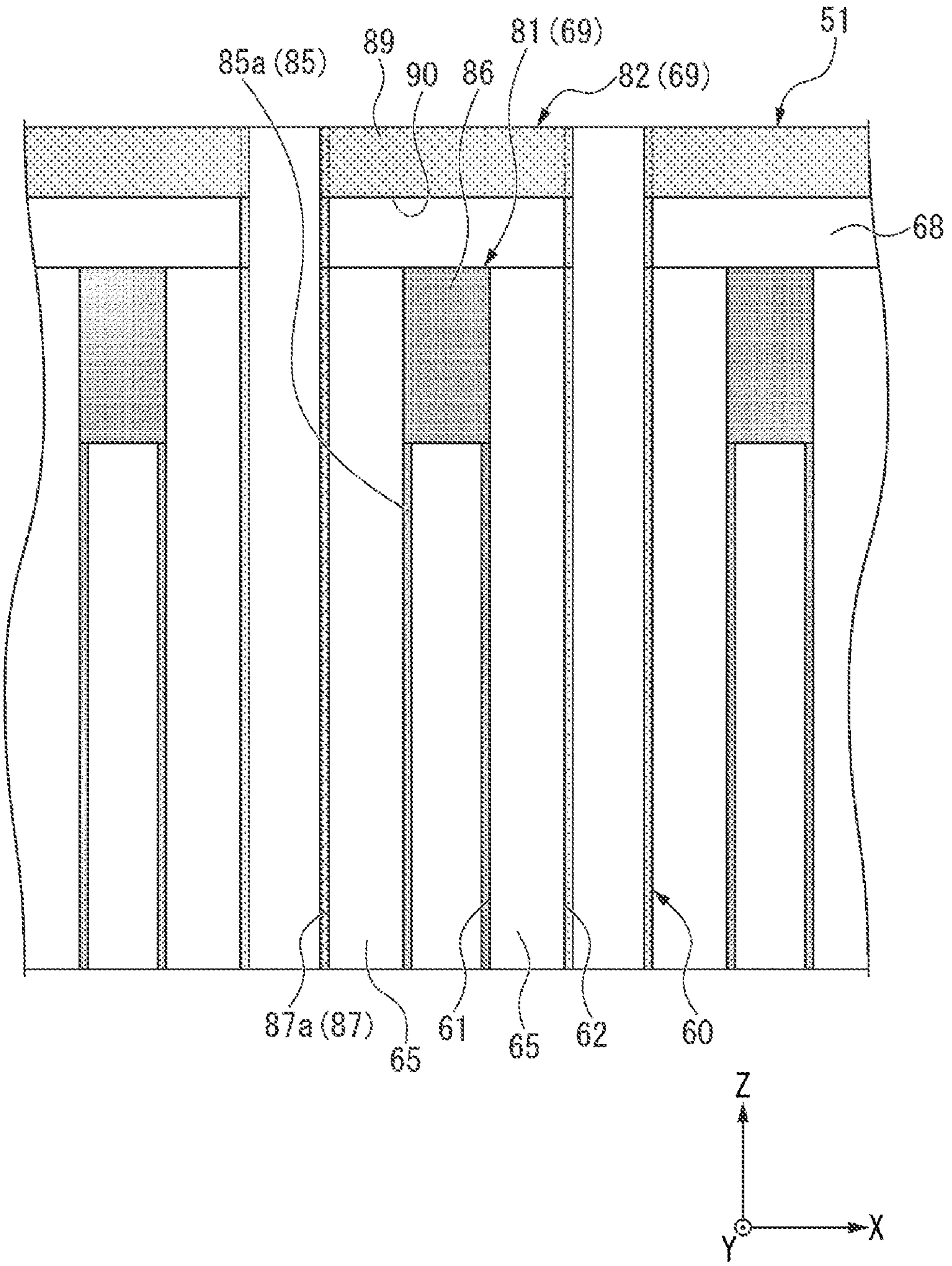
FIG. 5 is a plan view of an actuator plate related to the first embodiment.
Figure 6:
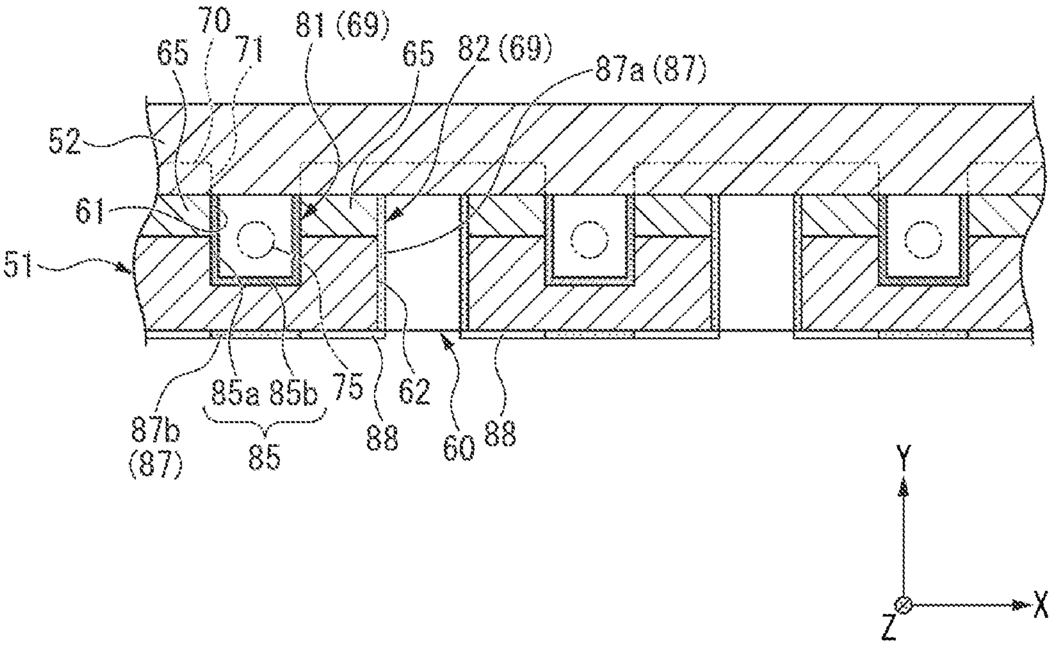
FIG. 6 is a diagram viewed along the arrow VI shown in FIG. 2.

FIG. 5 is a plan view of the actuator plate 51. FIG. 6 is a diagram viewed along the arrow VI shown in FIG. 2.

As shown in FIG. 3, FIG. 5, and FIG. 6, the common interconnections 81 are each provided with a common electrode 85 and a common terminal 86.

The common electrodes 85 are each formed on inner surfaces of the ejection channel 61. The common electrodes 85 are each provided with side-surface electrodes 85*a* and a bottom-surface electrode 85*b*. The side-surface electrodes 85*a* are respectively formed on inner side surfaces opposed to each other in the X direction out of the inner surfaces of the ejection channel 61. The side-surface electrodes 85*a* are each formed throughout the entire area of corresponding one of the inner side surfaces.

The bottom-surface electrode 85*b* is formed in the entire area of the bottom surface (a surface facing to the +Y side) of the ejection channel 61. The bottom-surface electrode 85*b* is connected integrally to the side-surface electrodes 85*a* provided to the same ejection channel 61. It should be noted that the side-surface electrodes 85*a* and the bottom-surface electrode 85*b* can be separated from each other in the ejection channel 61.

The common terminal 86 is formed on an obverse surface of the tail part 68. The common terminal 86 is disposed on the obverse surface of the tail part 68 so as to correspond to each of the ejection channels 61. Each of the common terminals 86 extends linearly in the Z direction above corresponding one of the ejection channels 61. The lower end portion in the common terminal 86 is connected to the common electrode 85 (the bottom-surface electrode 85*b*) in an upper-end opening edge of the ejection channel 61.

Figure 7:
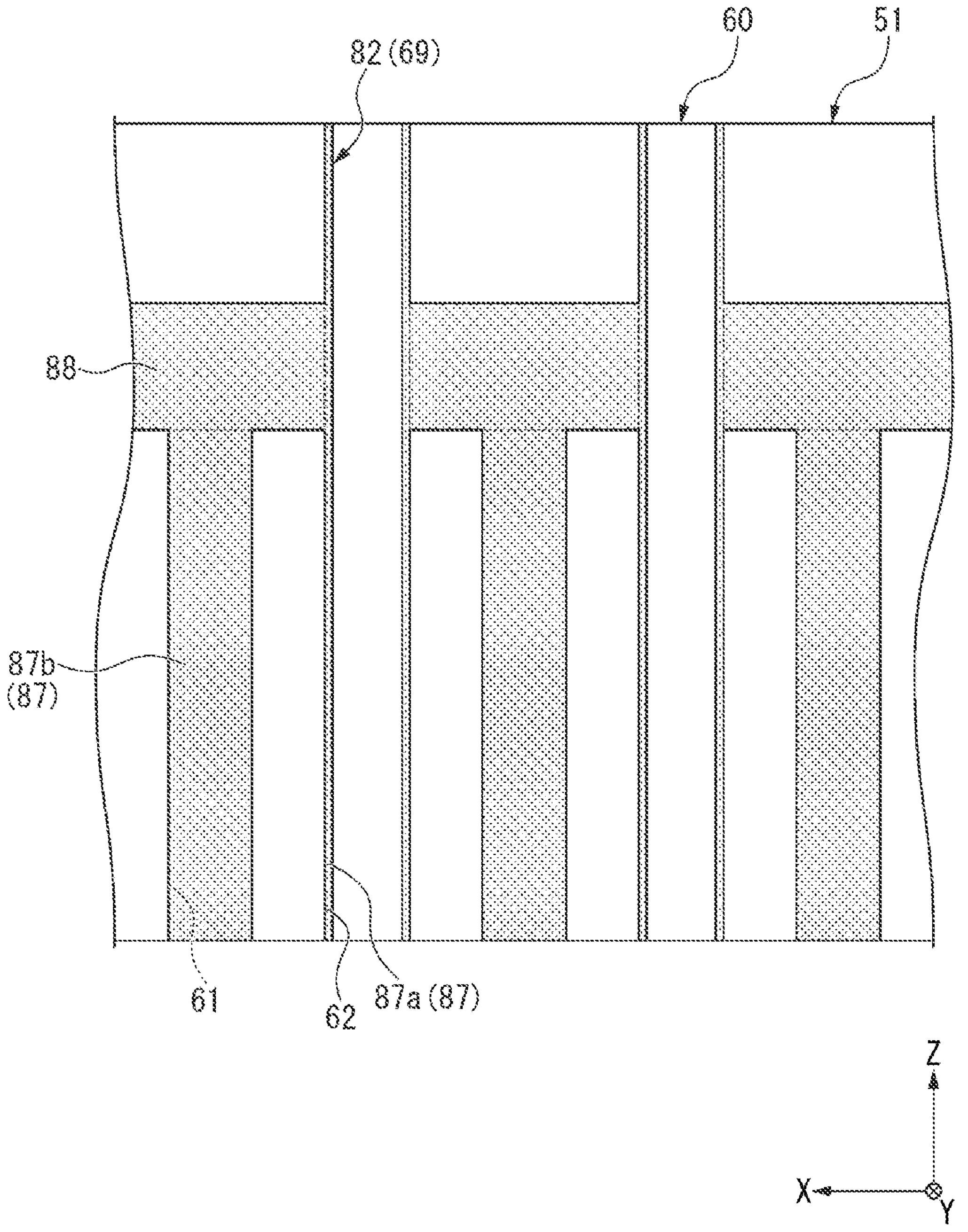
FIG. 7 is a bottom view of the actuator plate related to the first embodiment.

FIG. 7 is a bottom view of the actuator plate 51.

As shown in FIG. 4 through FIG. 7, the individual interconnection 82 is provided with individual electrodes 87, a coupling interconnection 88, and an individual terminal 89.

The individual electrodes 87 generate a potential difference from the common electrode 85. The individual electrodes 87 each include a first individual electrode 87*a* and a second individual electrode 87*b*.

The first individual electrodes 87*a* are respectively formed on the inner side surfaces opposed to each other in the X direction out of the inner surfaces of the non-ejection channels 62. The first individual interconnections 87*a* are each formed throughout the entire area of the inner side surface of the non-ejection channel 62. In other words, the first individual electrodes 87*a* extend toward the reverse surface beyond the bottom surface of the ejection channel 61. It should be noted that it is sufficient for the first individual electrodes 87*a* to be formed so as to at least partially overlap (face) the side-surface electrodes 85*a* when viewed from the X direction.

As shown in FIG. 7, the second individual electrode 87*b* is formed in a portion of the reverse surface of the actuator plate 51, the portion overlapping the ejection channel 61 when viewed from the Y direction. The second individual electrode 87*b* is formed to have a strip shape which has a width equivalent to that of the ejection channel 61, and which extends in the Z direction with a length equivalent to that of the ejection channel 61. It should be noted that it is sufficient for the second individual electrode 87*b* to be formed on at least a part of the reverse surface (an opposite surface) of the actuator plate 51. On this occasion, the second individual electrode 87*b* can be formed in the entire area of the reverse surface of the actuator plate 51.

The coupling interconnection 88 couples the first individual electrode 87*a* and the second individual electrode 87*b* to each other. The coupling interconnection 88 extends in an upper end portion of the reverse surface of the actuator plate 51 in the X direction. The coupling interconnection 88 couples the first individual electrodes 87*a* to each other, the first individual electrodes 87*a* being opposed in the X direction to each other across one ejection channel 61 in a reverse surface-side opening edge of the non-ejection channel 62. On the other hand, the coupling interconnection 88 is coupled to an upper end portion of the second individual electrode 87*b* in a central portion in the X direction. It should be noted that the coupling interconnection 88 can arbitrarily be changed as long as the coupling interconnection 88 has the configuration of coupling the first individual electrode 87*a* and the second individual electrode 87*b* to each other.

As shown in FIG. 5, the individual terminal 89 is formed in a portion of the obverse surface of the tail part 68, the portion being located above the common terminal 86. The individual terminal 89 is formed to have a strip shape extending in the X direction. The individual terminal 89 connects the first individual electrodes 87*a* to each other, the first individual electrodes 87*a* being opposed in the X direction to each other across the ejection channel 61, at obverse surface-side opening edges of the non-ejection channels 62 which are opposed in the X direction to each other across the ejection channel 61. In other words, the second individual electrode 87*b* is coupled to the individual terminal 89 via the coupling interconnection 88 and the first individual electrodes 87*a*. In the tail part 68, in a portion located between the common terminal 86 and the individual terminal 89, there is formed a partition groove 90. The partition groove 90 extends in the X direction in the tail part 68. The partition groove 90 separates the common terminal 86 and the individual terminal 89 from each other.

As shown in FIG. 3 and FIG. 4, a flexible printed board 91 is pressure-bonded to the obverse surface of the tail part 68. The flexible printed board 91 is coupled to the common terminals 86 and the individual terminals 89 on the obverse surface of the tail part 68. The flexible printed board 91 couples the head chip 50 and the control section to each other.

[Operation Method of Printer 1]

Then, there will be described when recording a character, a figure, or the like on the recording target medium P using the printer 1 described above.

It should be noted that it is assumed that as an initial state, the sufficient ink having colors different from each other is respectively encapsulated in the four ink tanks 13 shown in FIG. 1. Further, there is created the state in which the inkjet heads 5 are filled with the ink in the ink tanks 13 through the ink pipes 14, respectively.

Under such an initial state, when making the printer 1 operate, the recording target medium P is conveyed toward the +X side while being pinched by the rollers 11, 12 of the conveying mechanisms 2, 3. By the carriage 16 moving in the Y direction at the same time as the conveyance of the recording target medium P, the inkjet heads 5 mounted on the carriage 16 make a reciprocal motion in the Y direction.

While the inkjet heads 5 make the reciprocal motion, the ink is arbitrarily ejected toward the recording target medium P from each of the inkjet heads 5. When the reciprocal motion of the inkjet heads 5 is started due to the translation of the carriage 16 (see FIG. 1), the drive voltages are applied between the common electrodes 85 and the individual electrodes 87 via the flexible printed board 91. On this occasion, the drive voltage (a pulse signal) is applied between the electrodes 85, 87 by setting the individual electrode 87 at a drive potential Vdd, and the common electrode 85 at a reference potential GND.

Figure 8:
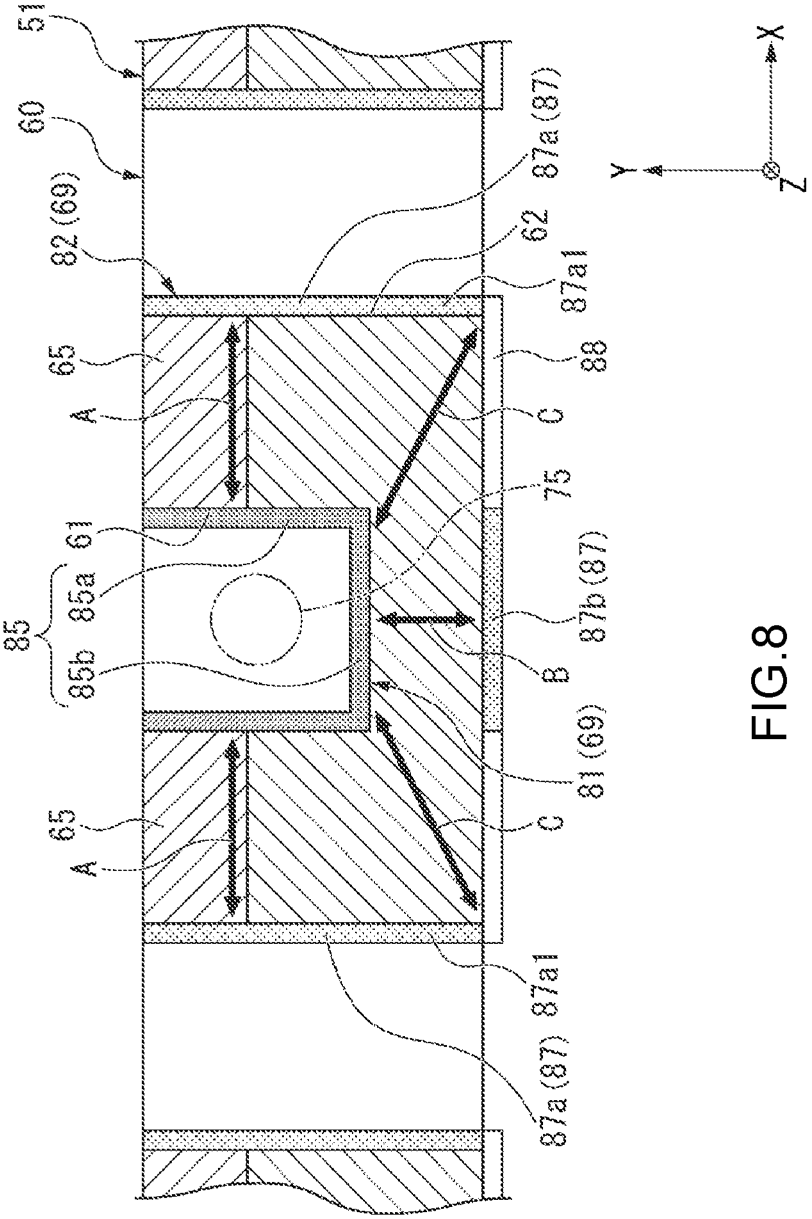
FIG. 8 is a diagram for explaining an operation of the head chip according to the first embodiment.

FIG. 8 is a diagram for explaining the operation of the head chip 50.

Then, as shown in FIG. 8, a potential difference occurs (the arrow A in FIG. 8) in the X direction between the side-surface electrode 85*a* and the first individual electrode 87*a*. Due to the potential difference having occurred in the X direction, an electric field occurs in the actuator plate 51 (the piezoelectric plates) in a direction perpendicular to the polarization direction (the Z direction). As a result, by the piezoelectric plates making a thickness-shear deformation in the X direction in the shear mode, the drive walls 65 make a flexural deformation to form a V-shape from a central portion in the Y direction of the ejection channel 61. In other words, the drive walls 65 deform so that the volume of the ejection channel 61 increases.

Further, between the bottom-surface electrode 85*b* and the second individual electrode 87*b*, there occurs the potential difference in the Y direction (the arrow B in FIG. 8). Due to the potential difference having occurred in the Y direction, an electric field occurs in the actuator plate 51 in a direction (the Y direction) parallel to the polarization direction. As a result, an elongation deformation in a direction (toward the reverse surface) in which the volume of the ejection channel 61 increases due to the bend mode occurs in a portion of the actuator plate 51, the portion being located between the bottom surface of the ejection channel 61 and the reverse surface of the actuator plate 51.

On that basis, in the first embodiment, the potential difference occurs (the arrow C in FIG. 8) between a portion (hereinafter referred to as an offset portion 87*a*1) of the first individual electrode 87*a*, the portion being located at the reverse surface side of the bottom surface of the ejection channel 61 and the bottom-surface electrode 85*b*. Thus, a portion of the actuator plate 51, the portion being located between the offset portion 87*al* and the bottom-surface electrode 85*b*, deforms in a direction in which the volume of the ejection channel 61 increases in the shear mode and the bend mode. In other words, in the first embodiment, due to the application of the drive voltage, the actuator plate 51 deforms so as to expand the ejection channel 61 toward the both sides in the X direction and the reverse surface side.

After the volume of each of the ejection channels 61 has increased, the drive voltage applied between the common electrodes 85 and the individual electrodes 87 is set to zero. Then, the drive walls 65 are restored, and the volume of the ejection channel 61 having once increased is restored to the original volume. Thus, the internal pressure of the ejection channel 61 increases to pressurize the ink. Then, a pressure wave generated due to the increase in pressure in the ejection channel 61 propagates toward the nozzle hole 75. As a result, the ink in the ejection channel 61 is ejected as a droplet through the nozzle hole 75. By the ink ejected from the nozzle hole 75 landing on the recording target medium P, it is possible to record printing information such as a character or an image on the recording target medium P.

<Method of Manufacturing Head Chip 50>

Figure 9:
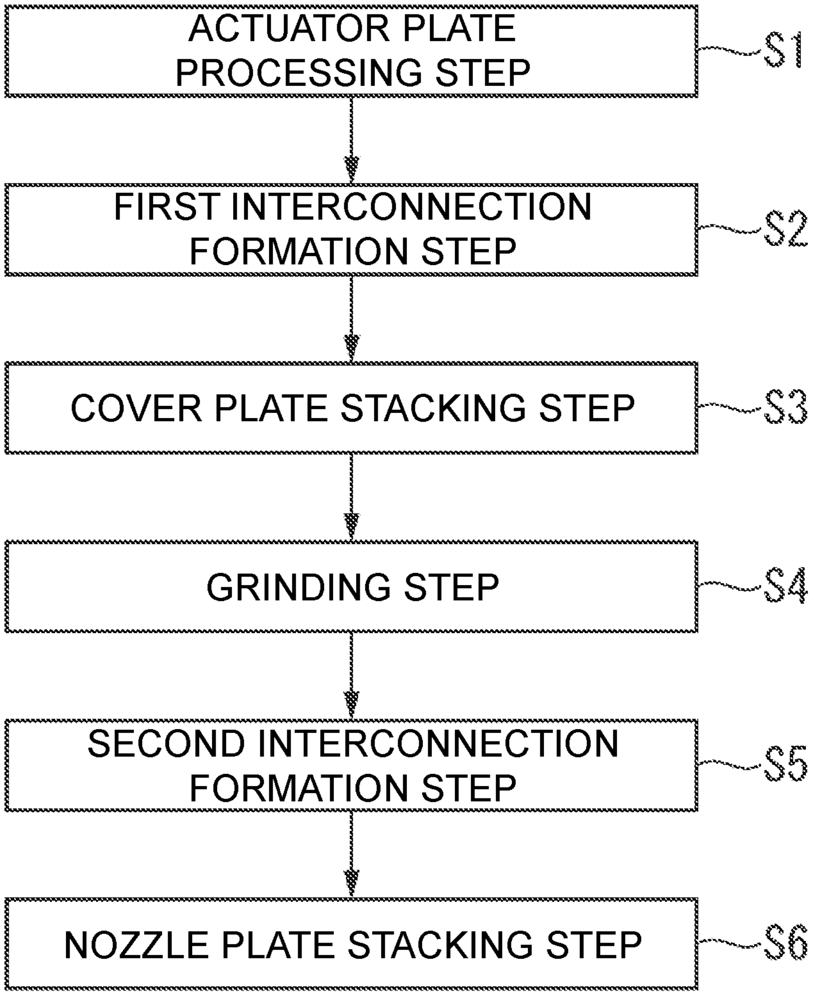
FIG. 9 is a flowchart showing a method of manufacturing the head chip according to the first embodiment.

Then, a method of manufacturing the head chip 50 will be described. FIG. 9 is a flowchart showing the method of manufacturing the head chip 50. In the following description, there is described when manufacturing the head chip 50 chip by chip as an example for the sake of convenience.

As shown in FIG. 9, the method of manufacturing the head chip 50 is provided with an actuator plate processing step S1, a first interconnection formation step S2, a cover plate stacking step S3, a grinding step S4, a second interconnection formation step S5, and a nozzle plate stacking step S6.

FIG. 10 through FIG. 14 are process diagrams of the head chip 50.

Figure 10:
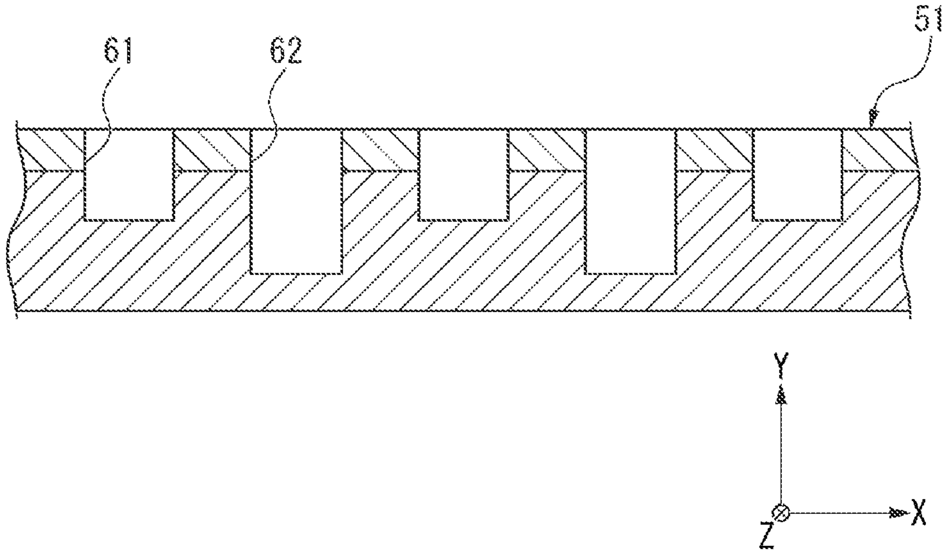
FIG. 10 is a process diagram of the head chip according to the first embodiment.

As shown in FIG. 10, in the actuator plate processing step S1, a dicer is made to enter a formation area of the ejection channels 61 and the non-ejection channels 62 in the actuator plate 51 from the obverse surface side of the actuator plate 51. On this occasion, an amount of the entrance of the dicer to the formation area of the non-ejection channels 62 is set deeper than an amount of the entrance of the dicer to the formation area of the ejection channels 61.

Figure 11:
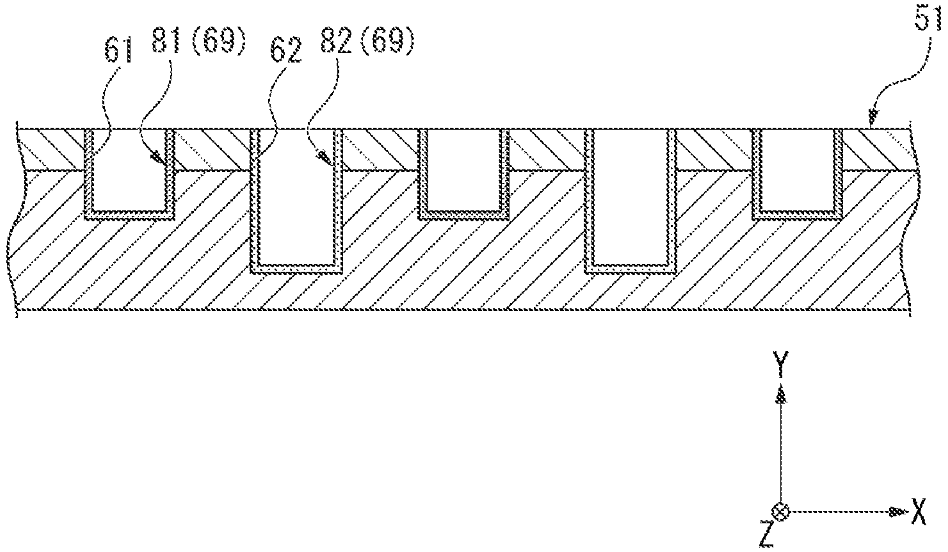
FIG. 11 is a process diagram of the head chip according to the first embodiment.

As shown in FIG. 11, in the first interconnection formation step S2, the electrode material is deposited from the obverse surface side of the actuator plate 51 to thereby form a part (the common electrodes 85, the first individual electrodes 87*a*, the common terminals 86, and the individual terminals 89) of the drive interconnections 69. In the first interconnection formation step S2, oblique evaporation, for example, is performed through a mask pattern. Thus, the electrode material is selectively formed at desired positions on the obverse surface of the actuator plate 51 and the inner surfaces of the channels 61, 62. After the deposition of the electrode material, the mask pattern is removed with a liftoff process or the like.

Figure 12:
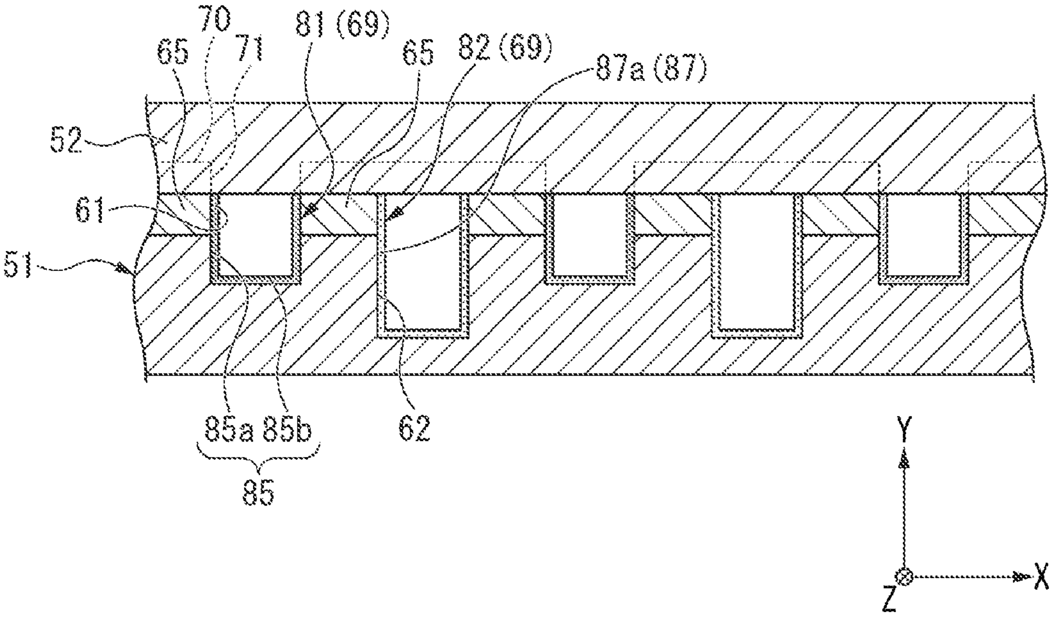
FIG. 12 is a process diagram of the head chip according to the first embodiment.

As shown in FIG. 12, in the cover plate stacking step S3, the cover plate 52 is attached to the obverse surface of the actuator plate 51.

Figure 13:
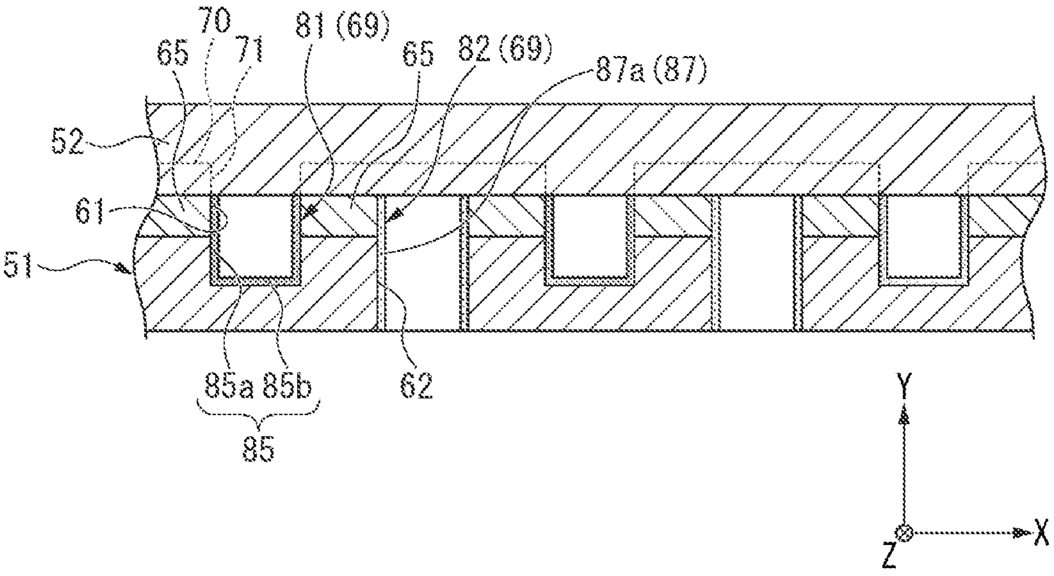
FIG. 13 is a process diagram of the head chip according to the first embodiment.

As shown in FIG. 13, in the grinding step S4, grinding processing is performed on the reverse surface of the actuator plate 51. On this occasion, the actuator plate 51 is ground so that the non-ejection channels 62 open on the reverse surface of the actuator plate 51.

Figure 14:
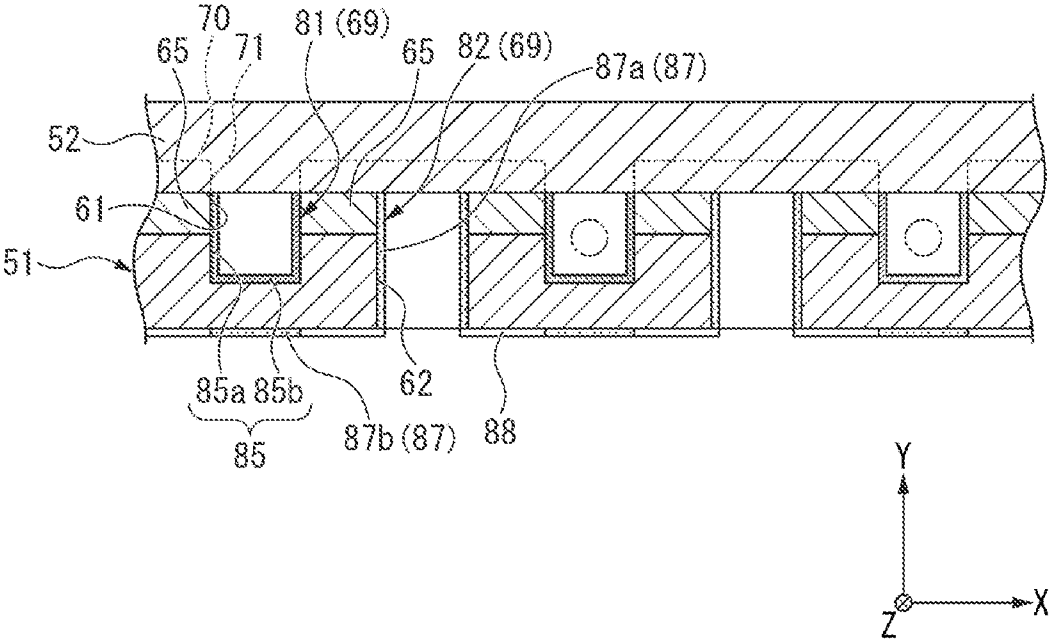
FIG. 14 is a process diagram of the head chip according to the first embodiment.

As shown in FIG. 14, in the second interconnection formation step S5, the electrode material is deposited from the reverse surface side of the actuator plate 51 to thereby form a part (the second individual electrodes 87*b*, the coupling interconnections 88) of the drive interconnections 69. In the second interconnection formation step S5, oblique evaporation, for example, is performed through a mask pattern. Thus, the electrode material is selectively formed at desired positions on the reverse surface of the actuator plate 51. After the deposition of the electrode material, the mask pattern is removed with a liftoff process or the like.

In the nozzle plate stacking step S6, the nozzle plate 53 is attached to the lower end surface of the actuator plate 51 in a state in which the nozzle holes 75 and the ejection channels 61 are aligned with each other.

Due to the steps described hereinabove, the head chip 50 is manufactured.

Here, there is adopted the configuration in which the head chip 50 according to the first embodiment is provided with an actuator plate 51 provided with the ejection channels 61 and the non-ejection channels 62 which open on the obverse surface side (a first side in the thickness direction), and which extend in the Z direction (a first direction), the side-surface electrodes (side-surface common electrodes) 85*a* formed on the inner side surfaces of the ejection channels 61, the bottom-surface electrodes (bottom-surface common electrodes) 85*b* formed on the bottom surfaces of the ejection channels 61, the first individual electrodes 87*a* formed on the inner side surfaces of the non-ejection channels 62, and the second individual electrodes 87*b* disposed on the reverse surface (the opposite surface facing to a second side in the thickness direction) of the actuator plate 51.

According to this configuration, by generating the potential difference in the X direction (a second direction) between the side-surface electrode 85*a* and the first individual electrode 87*a*, it is possible to deform the actuator plate 51 (the drive walls 65) in the X direction in the shear mode. Further, by generating the potential difference in the Y direction (the thickness direction) between the bottom-surface electrode 85*b* and the second individual electrode 87*b*, it is possible to deform the actuator plate 51 in the Y direction in the bend mode. As described above, by deforming the actuator plate 51 in both of the X direction and the Y direction, it is easy to ensure the elastic energy of the actuator plate 51 when applying the voltage. Therefore, even when ensuring the width of the channels 61, 62, it is easy to effectively transfer the elastic energy to the ink located inside the ejection channel 61 to ensure the pressure generated in the ejection channel 61 when ejecting the ink. As a result, it is possible to obtain a desired ejection performance. In this case, by ensuring the width of the channels 61, 62, it is easy to introduce the electrode material into the channels 61, 62 through the obverse surface-side opening parts of the channels 61, 62 when forming the electrode material on the inner surfaces of the channels 61, 62 with oblique evaporation. Therefore, it is possible to achieve an increase in manufacturing efficiency and yield ratio.

The head chip 50 according to the first embodiment is provided with the configuration in which the non-ejection channels 62 penetrate the actuator plate 51 in the Y direction, and at the same time, the first individual electrodes 87*a* are each formed throughout the entire area in the Y direction of the non-ejection channel 62.

According to this configuration, it is possible to generate the potential difference between the portion (the offset portion 87*a*1) of the first individual electrode 87*a*, the portion being located closer to the reverse surface than the bottom surface of the ejection channel 61, and the bottom-surface electrode 85*b*. Therefore, it is possible to more effectively deform the actuator plate 51 in a direction in which the volume of the ejection channel 61 increases. Thus, it is possible to achieve a further increase in pressure generated in the ejection channel 61 when ejecting the ink.

The head chip 50 according to the first embodiment is provided with the configuration in which the coupling interconnections 88 each connecting the first individual electrode 87*a* and the second individual electrode 87*b* to each other are formed on the reverse surface of the actuator plate 51.

According to this configuration, by coupling the first individual electrode 87*a* and the second individual electrode 87*b* to each other on the reverse surface of the actuator plate 51, it becomes possible to couple the first individual electrodes 87*a* and the second individual electrodes 87*b* to the flexible printed board 91 in a lump. Thus, it is possible to prevent a complication of the configuration due to the addition of the second individual electrodes 87*b*.

The head chip 50 according to the first embodiment is provided with the configuration in which the nozzle plate 53 is overlapped on the lower end surface (a first side end surface) of the actuator plate 51.

According to this configuration, it becomes possible to reduce the size of the outer shape of the head chip 50 viewed from the Z direction while ensuring the length of the channels 61, 62.

Since the inkjet head 5 and the printer 1 according to the first embodiment are each equipped with the head chip 50 described above, it is possible to provide the inkjet head 5 and the printer 1 which are high in quality and capable of exerting the desired ejection performance.

Second Embodiment

Figure 15:
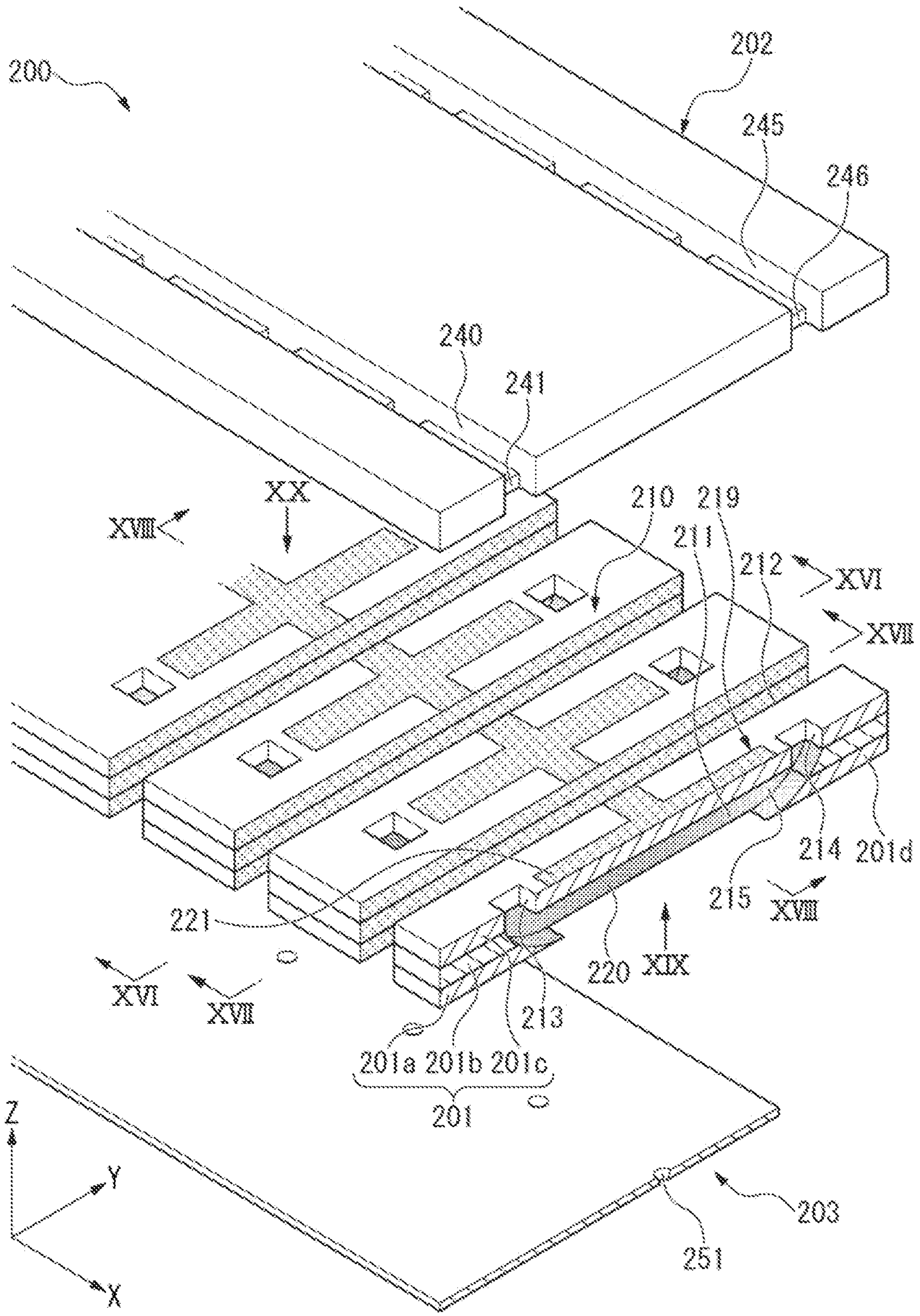
FIG. 15 is an exploded perspective view of a head chip according to a second embodiment.
Figure 16:
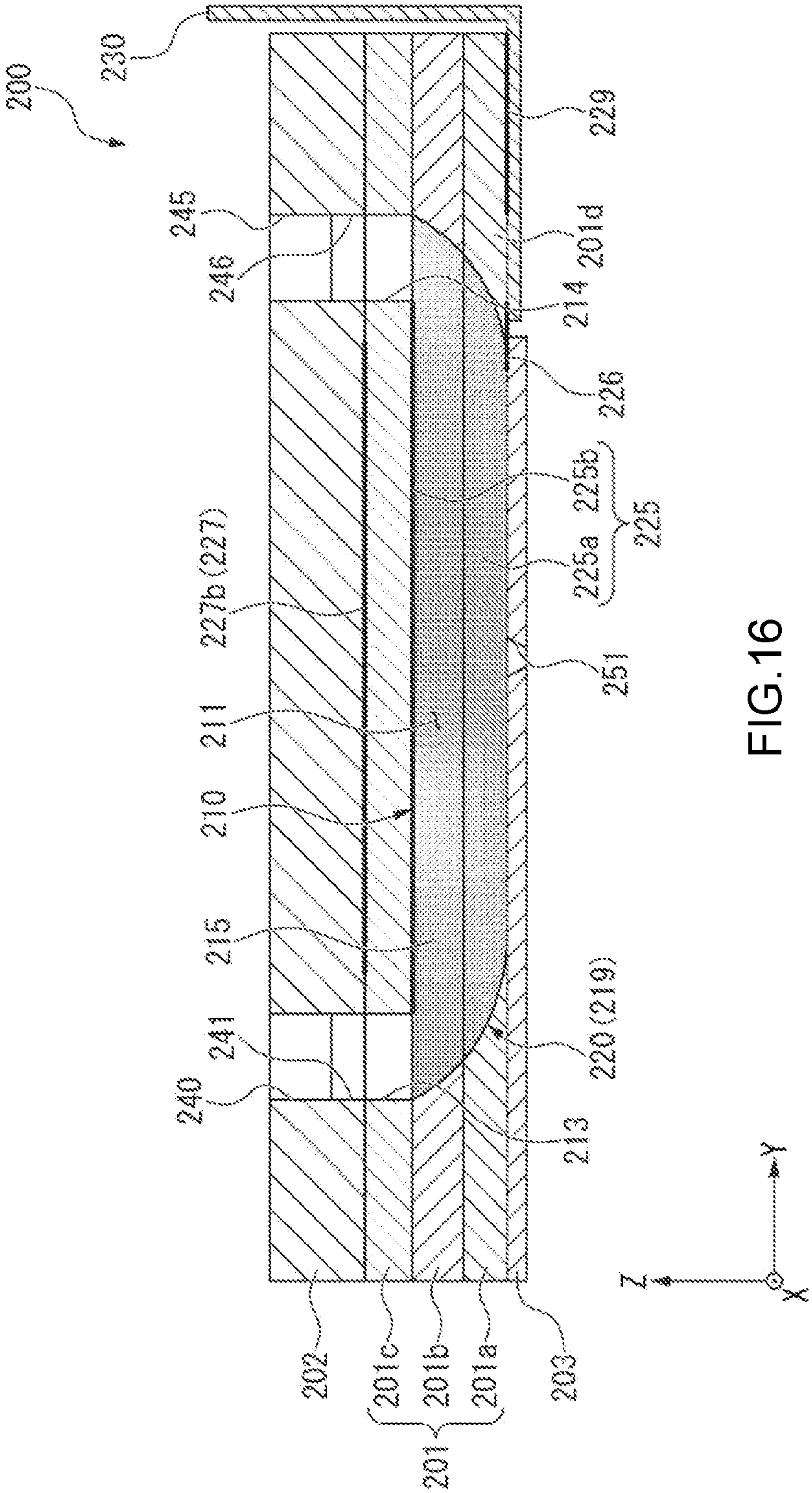
FIG. 16 is a cross-sectional view corresponding to the line XVI-XVI shown in FIG. 15.
Figure 17:
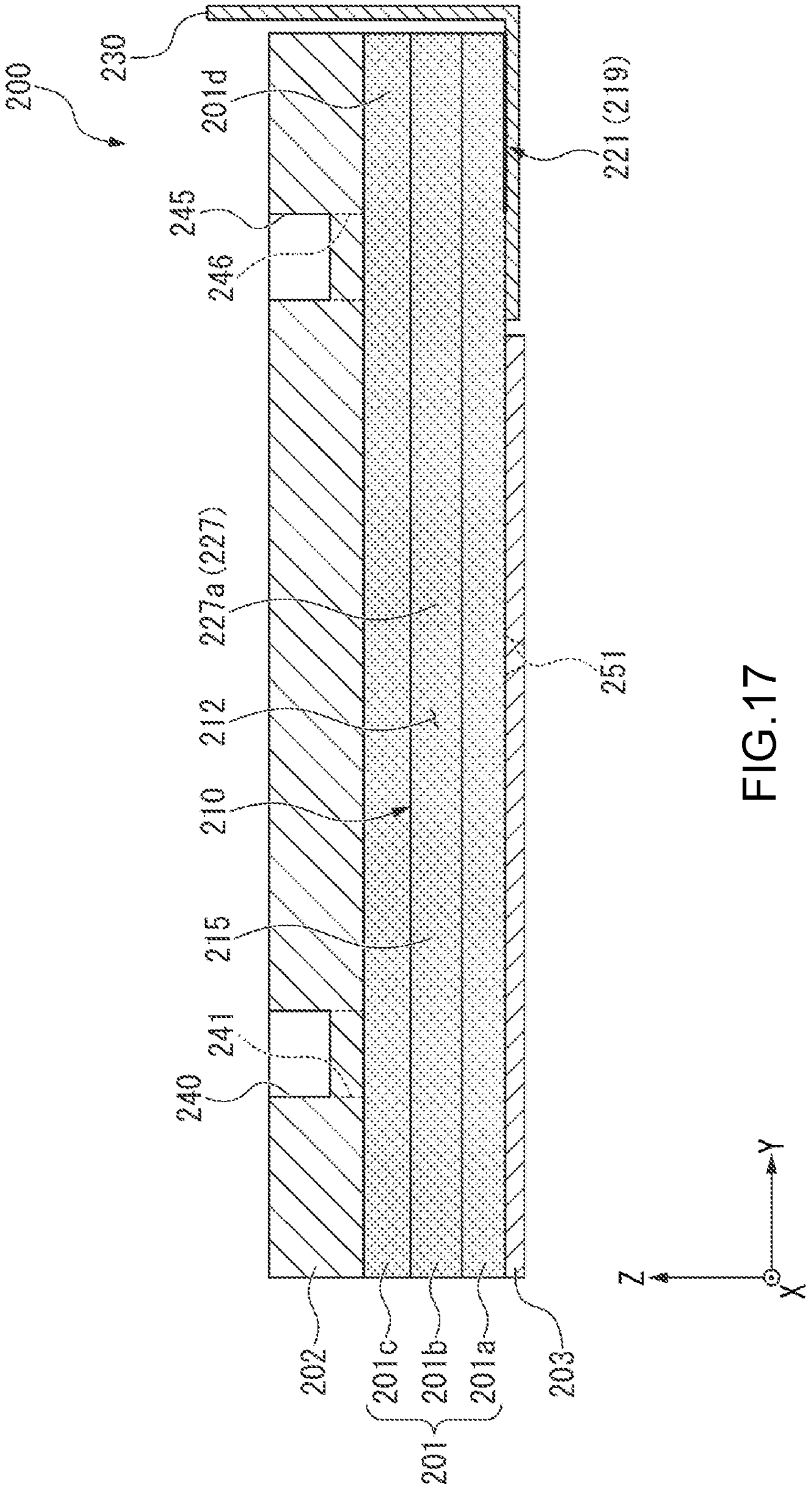
FIG. 17 is a cross-sectional view corresponding to the line XVII-XVII shown in FIG. 15.

FIG. 15 is an exploded perspective view of a head chip 200 according to a second embodiment. FIG. 16 is a cross-sectional view corresponding to the line XVI-XVI shown in FIG. 15. FIG. 17 is a cross-sectional view corresponding to the line XVII-XVII shown in FIG. 15. In the second embodiment, there is described when adopting the present disclosure in the head chip 200 of a side-shoot type.

As shown in FIG. 15 through FIG. 17, the head chip 200 of the side-shoot type ejects the ink from a central portion in the extending direction in an ejection channel 211. Specifically, the head chip 200 is provided with an actuator plate 201, a cover plate 202, and a nozzle plate 203.

The actuator plate 201 has a configuration in which three piezoelectric plates (a first piezoelectric plate 201*a*, a second piezoelectric plate 201*b*, and a third piezoelectric plate 201*c*) are stacked on one another in the Z direction (a thickness direction). The first piezoelectric plate 201*a* and the second piezoelectric plate 201*b* form a so-called chevron substrate in which the polarization directions are different from each other in the Z direction similarly to the first embodiment. The polarization direction of the third piezoelectric plate 201*c* is set similar to that of the second piezoelectric plate 201*b*. In the second embodiment, the polarization direction of the first piezoelectric plate 201*a* is set downward, and the polarization directions of the second piezoelectric plate 201*b* and the third piezoelectric plate 201*c* are set upward.

The actuator plate 201 is provided with a channel array 210. In the channel array 210, the ejection channels 211 and non-ejection channels 212 are formed so as to alternately be arranged side by side in the X direction.

As shown in FIG. 15 and FIG. 16, the ejection channels 211 are each formed so as to straddle the first piezoelectric plate 201*a* and the second piezoelectric plate 201*b* in the Z direction. The ejection channels 211 are each formed to have a circular arc shape convex downward when viewed from the X direction. The ejection channels 211 each open on a lower surface of the actuator plate 201 (the first piezoelectric plate 201*a*) in a central portion in the Y direction. In contrast, an upper end opening part of each of the ejection channels 211 is closed by the third piezoelectric plate 201*c*. The ejection channel 211 gradually decreases in depth in directions toward the outside in the Y direction in both end portions in the Y direction.

As shown in FIG. 15 and FIG. 17, the non-ejection channel 212 linearly extends in the Y direction in the state of penetrating the actuator plate 201 (the first piezoelectric plate 201*a* through the third piezoelectric plate 201*c*) in the Z direction. In the actuator plate 201, portions located between the ejection channels 211 and the non-jet channels 212 each constitute a drive wall 215. Therefore, both sides in the X direction of each of the channels 211, 212 are surrounded by the pair of drive walls 215.

To the third piezoelectric plate 201*c*, there are provided entrance communication channels 213 and exit communication channels 214. The entrance communication channels 213 each penetrate a portion of the third piezoelectric plate 201*c*, the portion overlapping a −Y-side end portion of the ejection channel 211 when viewed from the Z direction. The exit communication channels 214 each penetrate a portion of the third piezoelectric plate 201*c*, the portion overlapping a +Y-side end portion of the ejection channel 211 when viewed from the Z direction.

As shown in FIG. 15, the actuator plate 201 is provided with drive interconnections 219. The drive interconnections 219 consist of common interconnections 220 and individual interconnections 221. As shown in FIG. 16, the common interconnections 220 are each provided with a common electrode 225 and a common terminal 226.

Figure 18:
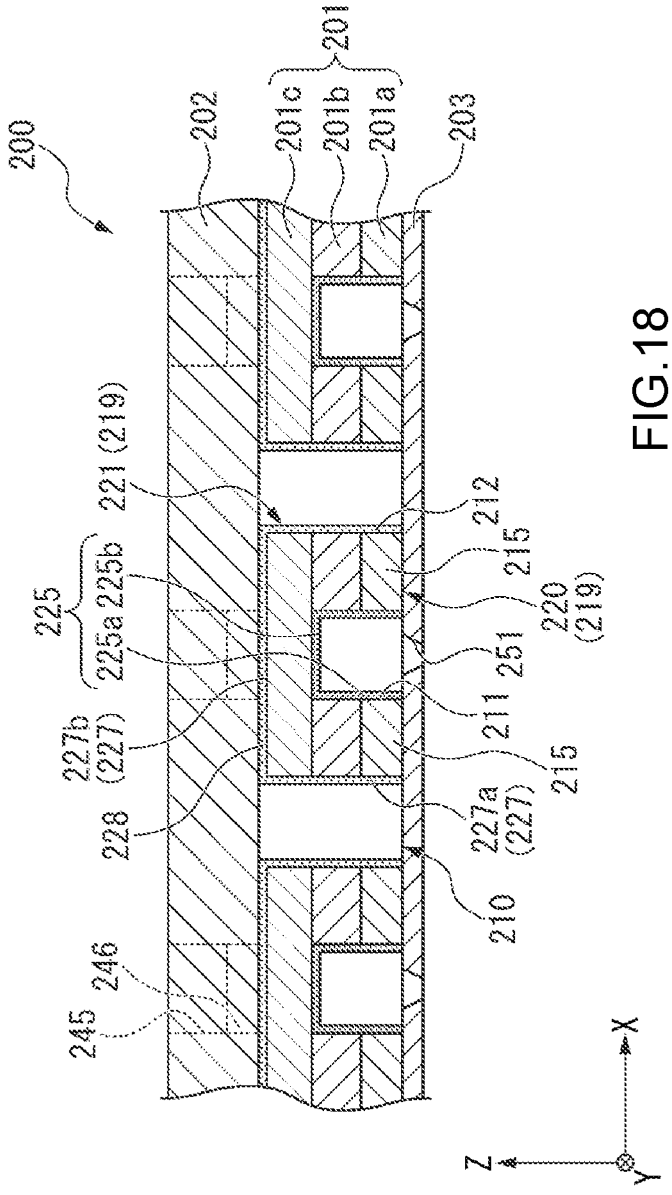
FIG. 18 is a cross-sectional view corresponding to the line XVIII-XVIII shown in FIG. 15.

FIG. 18 is a cross-sectional view corresponding to the line XVIII-XVIII shown in FIG. 15.

As shown in FIG. 16 and FIG. 18, the common electrode 225 is formed on inner surfaces of the ejection channel 211. The common electrode 225 is provided with side-surface electrodes 225*a* and a bottom-surface electrode 225*b*. The side-surface electrodes 225*a* are respectively formed on inner side surfaces opposed in the X direction to each other out of the inner surfaces of the ejection channel 211. The side-surface electrodes 225*a* are each formed throughout the entire area of corresponding one of the inner side surfaces.

The bottom-surface electrode 225*b* is formed in the entire area of the bottom surface (a surface facing downward) of each of the ejection channels 211. The bottom-surface electrode 225*b* is connected integrally to the side-surface electrodes 225*a* provided to the same ejection channel 211.

Figure 19:
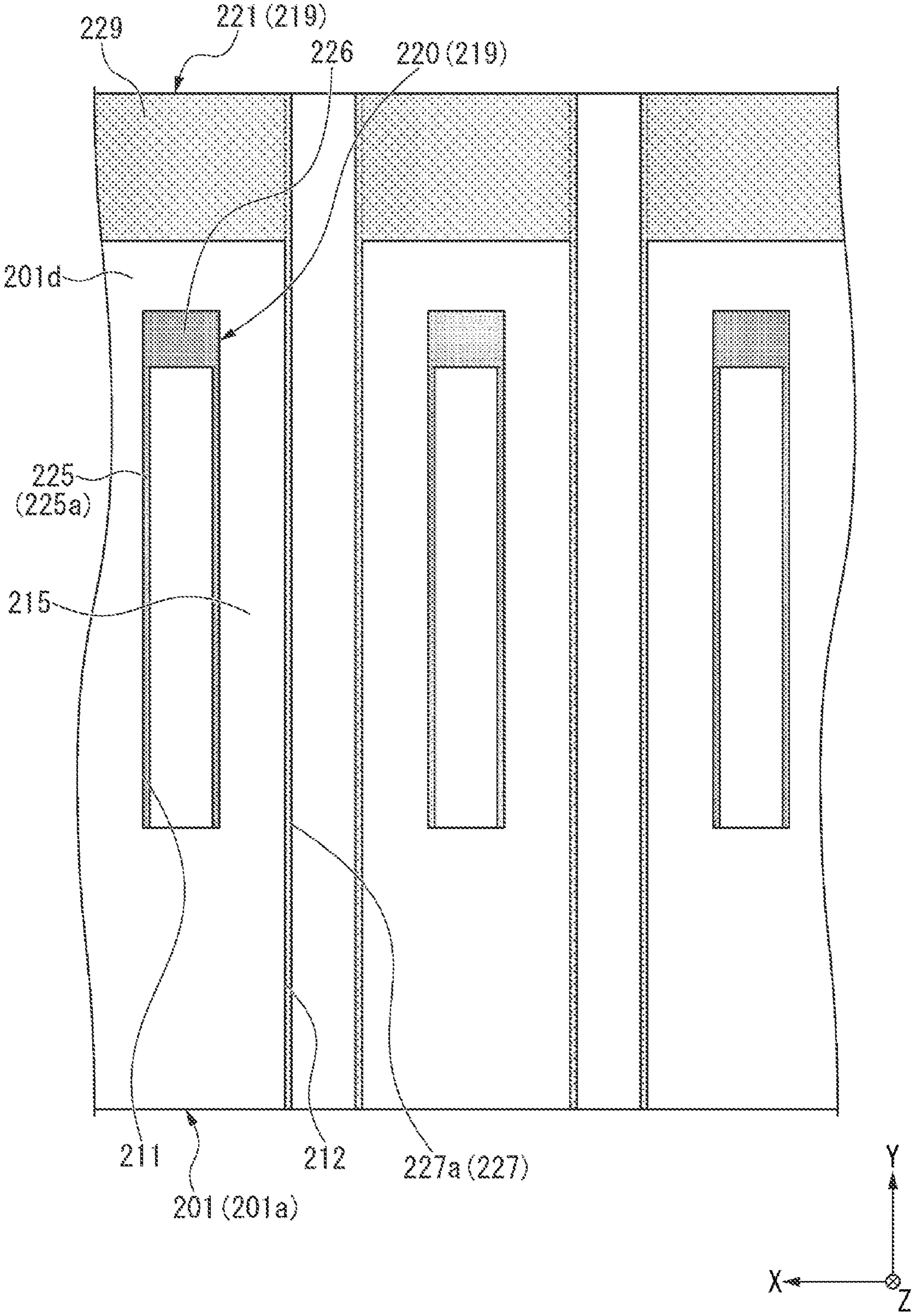
FIG. 19 is a diagram viewed along the arrow XIX shown in FIG. 15.

FIG. 19 is a diagram viewed along the arrow XIX shown in FIG. 15.

As shown in FIG. 19, the common terminal 226 is formed in a portion (hereinafter referred to as a tail part 201*d*) of the actuator plate 201, the portion being located at the +Y side with respect to the ejection channel 211. The common terminal 226 is disposed on the lower surface of the tail part 201*d* so as to correspond to each of the ejection channels 211. The common terminals 226 each extend linearly in the Y direction with respect to corresponding one of the ejection channels 211. The −Y-side end portion in the common terminal 226 is connected to the common electrode 225 through a lower end opening edge of the ejection channel 211.

Figure 20:
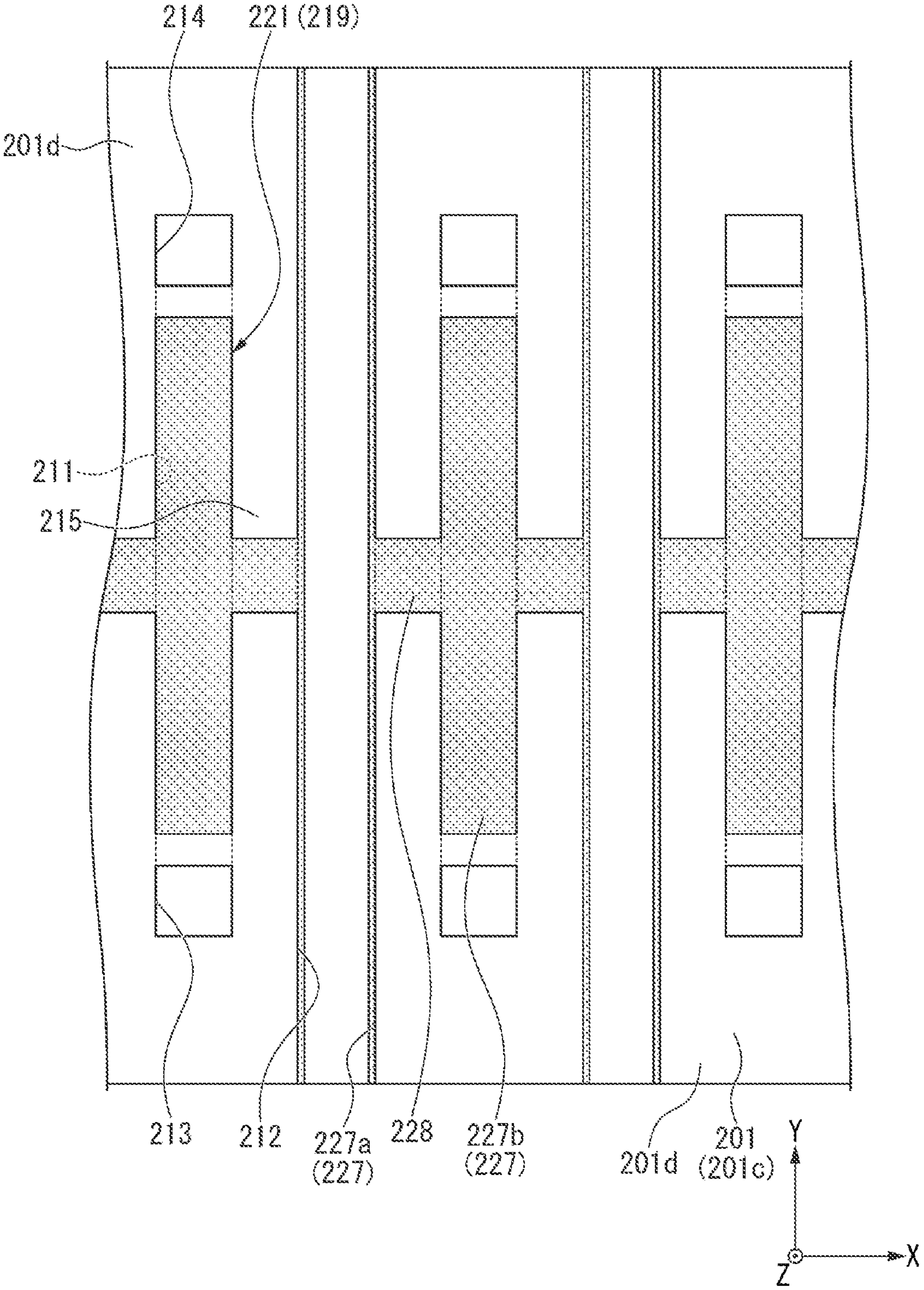
FIG. 20 is a diagram viewed along the arrow XX shown in FIG. 15.

FIG. 20 is a diagram viewed along the arrow XX shown in FIG. 15.

As shown in FIG. 17 through FIG. 20, the individual interconnection 221 is provided with an individual electrode 227, a coupling interconnection 228, and an individual terminal 229.

The individual electrode 227 includes first individual electrodes 227*a* and a second individual electrode 227*b*. The first individual electrodes 227*a* are respectively formed on the inner side surfaces opposed to each other in the X direction out of the inner surfaces of each of the non-ejection channels 212. The second individual electrode 227*b* is formed in a portion of an upper surface of the actuator plate 201 (the third piezoelectric plate 201*c*), the portion overlapping the ejection channel 211 when viewed from the Z direction. The second individual electrode 227*b* is formed to have a strip shape which has a width equivalent to that of the ejection channel 211, and which extends in the Y direction.

The coupling interconnection 228 extends in the X direction in a central portion in the Y direction out of the upper surface (an opposite surface) of the actuator plate 201. The coupling interconnection 228 couples the first individual electrodes 227*a* to each other, the first individual electrodes 227*a* being opposed in the X direction to each other across one ejection channel 211, at an upper end opening edge of the non-ejection channel 212. Meanwhile, the coupling interconnection 228 is coupled to the second individual electrode 227*b* on the upper surface of the actuator plate 201.

As shown in FIG. 19, the individual terminal 229 is formed in a portion of the lower surface of the tail part 201*d*, the portion being located at the +Y side of the common terminal 226. The individual terminal 229 is provided with a strip shape extending in the X direction. The individual terminal 229 connects the first individual electrodes 227*a* to each other, the first individual electrodes 227*a* being opposed in the X direction to each other across the ejection channel 211, at lower end opening edges of the non-ejection channels 212 which are opposed in the X direction to each other across the ejection channel 211.

As shown in FIG. 16 and FIG. 17, a flexible printed board 230 is pressure-bonded to the lower surface of the tail part 201*d*. The flexible printed board 230 is coupled to the common terminals 226 and the individual terminals 229 on the lower surface of the tail part 201*d*.

A cover plate 202 is overlapped on the upper surface of the actuator plate 201 so as to cover the upper end opening part of each of the channels 211, 212. In the cover plate 202, at a position overlapping the −Y-side end portion of the channel array 210 in the plan view, there is formed an entrance common ink chamber 240. The entrance common ink chamber 240 extends in the X direction with a length sufficient for straddling, for example, the channel array 210, and at the same time, opens on the upper surface of the cover plate 202.

In the entrance common ink chamber 240, at the positions overlapping the entrance communication channels 213 in the plan view, there are formed entrance slits 241. The entrance slits 241 each make the ejection channel 211 and the entrance common ink chamber 240 be communicated with each other through the entrance communication channel 213.

In the cover plate 202, at a position overlapping the +Y-side end portion of the channel array 210 in the plan view, there is formed an exit common ink chamber 245. The exit common ink chamber 245 extends in the X direction with a length sufficient for straddling, for example, the channel array 210, and at the same time, opens on the upper surface of the cover plate 202.

In the exit common ink chamber 245, at positions overlapping the respective exit communication channels 214 in the plan view, there are formed exit slits 246. The exit slits 246 each make the ejection channel 211 and the exit common ink chamber 245 be communicated with each other. Therefore, the entrance slits 241 and the exit slits 246 are communicated with the respective ejection channels 211 on the one hand, but are not communicated with the non-ejection channels 212 on the other hand.

As shown in FIG. 16, the nozzle plate 203 is bonded to the lower surface of the actuator plate 201. The nozzle plate 203 is provided with a plurality of nozzle holes 251 penetrating the nozzle plate 203 in the Z direction. The nozzle holes 251 are arranged at intervals in the X direction. The nozzle holes 251 are separately communicated with central portions in the Y direction of the ejection channels 211.

Also in the second embodiment, when ejecting the ink, by generating the potential difference in the X direction between the side-surface electrode 225*a* and the first individual electrode 227*a*, it is possible to deform the actuator plate 201 (the drive walls 215) in the X direction in the shear mode. Further, by generating the potential difference in the Z direction between the bottom-surface electrode 225*b* and the second individual electrode 227*b*, it is possible to deform the actuator plate 201 in the Z direction in the bend mode.

On that basis, it is possible to generate the potential difference in the Z direction between the portion of the first individual electrode 227*a*, the portion being located above the bottom surface of the ejection channel 211, and the bottom-surface electrode 225*b*. Therefore, it is possible to deform the actuator plate 201 in a direction in which the volume of the ejection channel 211 increases in the shear mode and the bend mode.

As described above, by deforming the actuator plate 201 in both of the X direction and the Z direction, it is easy to ensure the elastic energy of the actuator plate 201 when applying the voltage. Therefore, it is easy to ensure the pressure to be generated in the ejection channel 211 when ejecting the ink, and it is possible to obtain the desired ejection performance.

Moreover, the head chip 200 according to the second embodiment is provided with the configuration in which the cover plate 202 having the entrance slits (entrance flow channels) 241 communicated with the ejection channels 211 in the −Y-side end portions (first side end portions in the first direction), and the exit slits (exit flow channels) 246 communicated with the ejection channels 211 in the +Y-side end portions (second side end portions in the first direction) is disposed, and the nozzle plate 203 provided with the nozzle holes 251 communicated with the ejection channels 211 is disposed below (at the first side in the thickness direction of) the actuator plate 201.

According to this configuration, by circulating the ink through the entrance slits 241, the ejection channels 211, and the exit slits 246, it is possible to ensure the flow rate of the ink flowing through the ejection channels 211. On that basis, in the second embodiment, since it is possible to increase the pressure to be generated as described above, it is possible to ensure the ejection amount of the ink to increase the printing efficiency.

Third Embodiment

Figure 21:
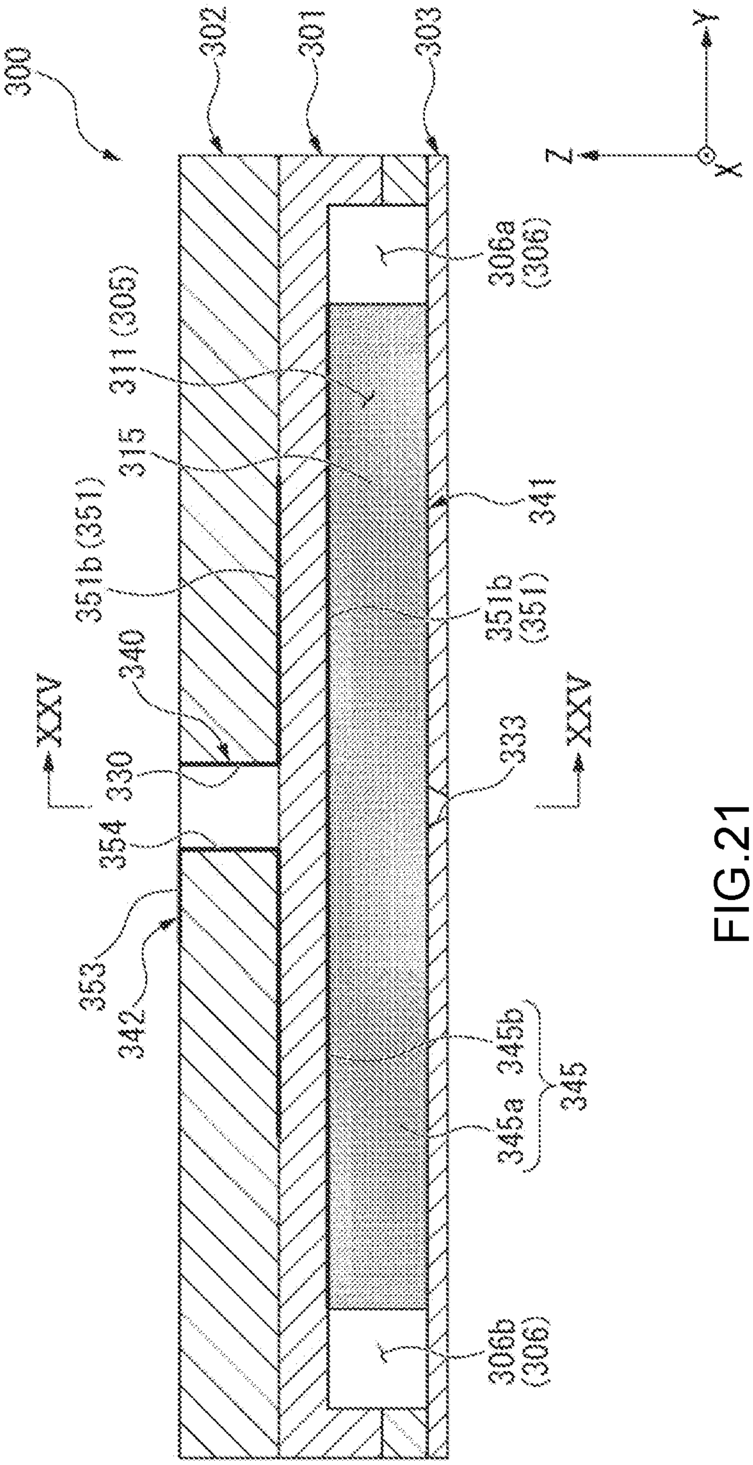
FIG. 21 is a cross-sectional view of a head chip according to a third embodiment.
Figure 22:
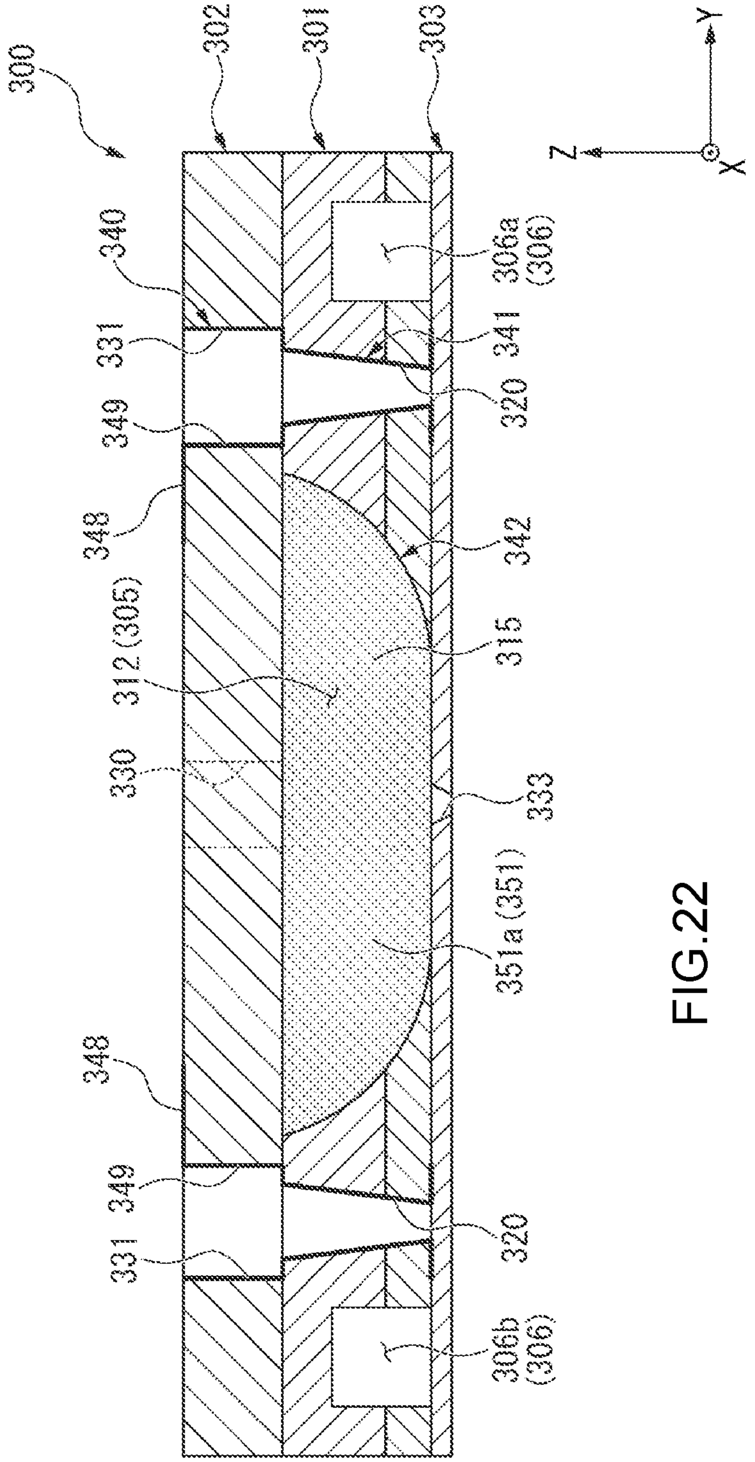
FIG. 22 is a cross-sectional view of the head chip according to the third embodiment.

FIG. 21 and FIG. 22 are cross-sectional views of a head chip 300 according to a third embodiment.

The head chip 300 shown in FIG. 21 and FIG. 22 is provided with an actuator plate 301, a cover plate 302, and a nozzle plate 303.

The actuator plate 301 has a configuration in which the two piezoelectric plates different in polarization direction from each other in the Z direction are stacked on one another. The actuator plate 301 is provided with a channel array 305 and common flow channels 306.

In the channel array 305, ejection channels 311 and non-ejection channels 312 are formed so as to alternately be arranged side by side in the X direction across drive walls 315. The ejection channels 311 each have a groove shape which opens on a lower surface of the actuator plate 301, and which extends in the Y direction. The depth in the Z direction in the ejection channels 311 is made uniform throughout the entire length in the Y direction.

The non-ejection channels 312 are each formed to have a circular arc shape convex downward when viewed from the X direction. The non-ejection channels 312 open on each of an upper surface and a lower surface of the actuator plate 301.

The common flow channels 306 consist of an entrance-side common flow channel 306*a* and an exit-side common flow channel 306*b*.

The entrance-side common flow channel 306*a* is formed in a portion of the actuator plate 301, the portion being located at the +Y side with respect to the channel array 305. The entrance-side common flow channel 306*a* opens on the lower surface of the actuator plate 301, and at the same time, extends in the X direction with a length enough to straddle the whole of the channel array 305. To the entrance-side common flow channel 306*a*, there are coupled +Y-side end portions of the respective ejection channels 311. Thus, the ink flowing through the entrance-side common flow channel 306*a* is delivered to the respective ejection channels 311. A −X-side end portion in the entrance-side common flow channel 306*a* is coupled to an entrance port (not shown). The ink located in the ink tank is supplied to the entrance-side common flow channel 306*a* through the entrance port.

The exit-side common flow channel 306*b* is formed in a portion of the actuator plate 301, the portion being located at the −Y side with respect to the channel array 305. The exit-side common flow channel 306*b* opens on the lower surface of the actuator plate 301, and at the same time, extends in the X direction with a length enough to straddle the whole of the channel array 305. To the exit-side common flow channel 306*b*, there are coupled −Y-side end portions of the respective ejection channels 311. Thus, the ink having passed through the ejection channels 311 is returned to the exit-side common flow channel 306*b*. A +X-side end portion in the exit-side common flow channel 306*b* is coupled to the exit port (not shown). The ink flowing through the exit-side common flow channel 306*b* is returned to the inside of the ink tank through the exit port.

As shown in FIG. 22, a pair of common interconnecting first holes 320 are respectively formed in portions of the actuator plate 301, the portions being located at both sides in the Y direction with respect to each of the non-ejection channels 312. The pair of common interconnecting first holes 320 penetrate the actuator plate 301 in the Z direction. It should be noted that it is possible for the common interconnecting first hole 320 to be formed at one side alone with respect to each of the non-ejection channels 312.

The cover plate 302 is fixed to the upper surface of the actuator plate 301 with an adhesive or the like. The cover plate 302 closes upper end opening parts of the non-ejection channels 312 and the common interconnecting first holes 320.

As shown in FIG. 21, individual interconnecting holes 330 are respectively formed in portions of the cover plate 302, the portions overlapping the respective ejection channels 311 in the plan view. The individual interconnecting holes 330 each penetrate the cover plate 302 in the Z direction. In other words, the upper surface of the actuator plate 301 is exposed through the individual interconnecting holes 330.

As shown in FIG. 22, common interconnecting second holes 331 are formed in portions of the cover plate 302, the portions overlapping the respective common interconnecting first holes 320 in the plan view. The common interconnecting second hole 331 penetrates the cover plate 302 in the Z direction. The common interconnecting second hole 331 is communicated with the common interconnecting first hole 320.

The nozzle plate 303 is fixed to the lower surface of the actuator plate 301 with an adhesive or the like. The nozzle plate 303 closes lower end opening parts of the ejection channels 311, the non-ejection channels 312, the common flow channels 306, and the common interconnecting first holes 320. The nozzle plate 303 is provided with a plurality of nozzle holes 333 penetrating the nozzle plate 303 in the Z direction. The nozzle holes 333 are separately communicated with central portions in the Y direction of the respective ejection channels 311.

Then, drive interconnections 340 provided to the head chip 300 will be described.

Figure 23:
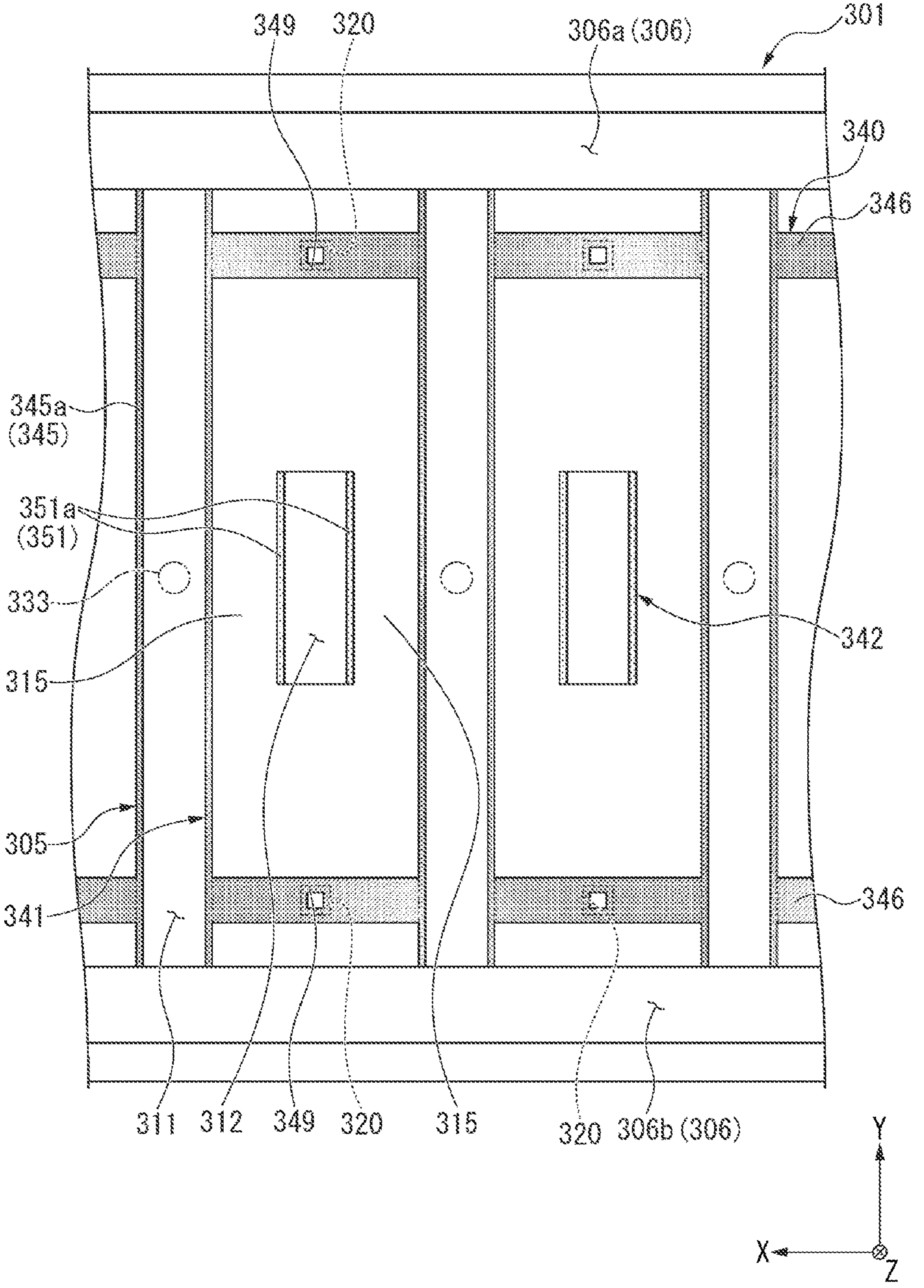
FIG. 23 is a bottom view of an actuator plate related to the third embodiment.
Figure 24:
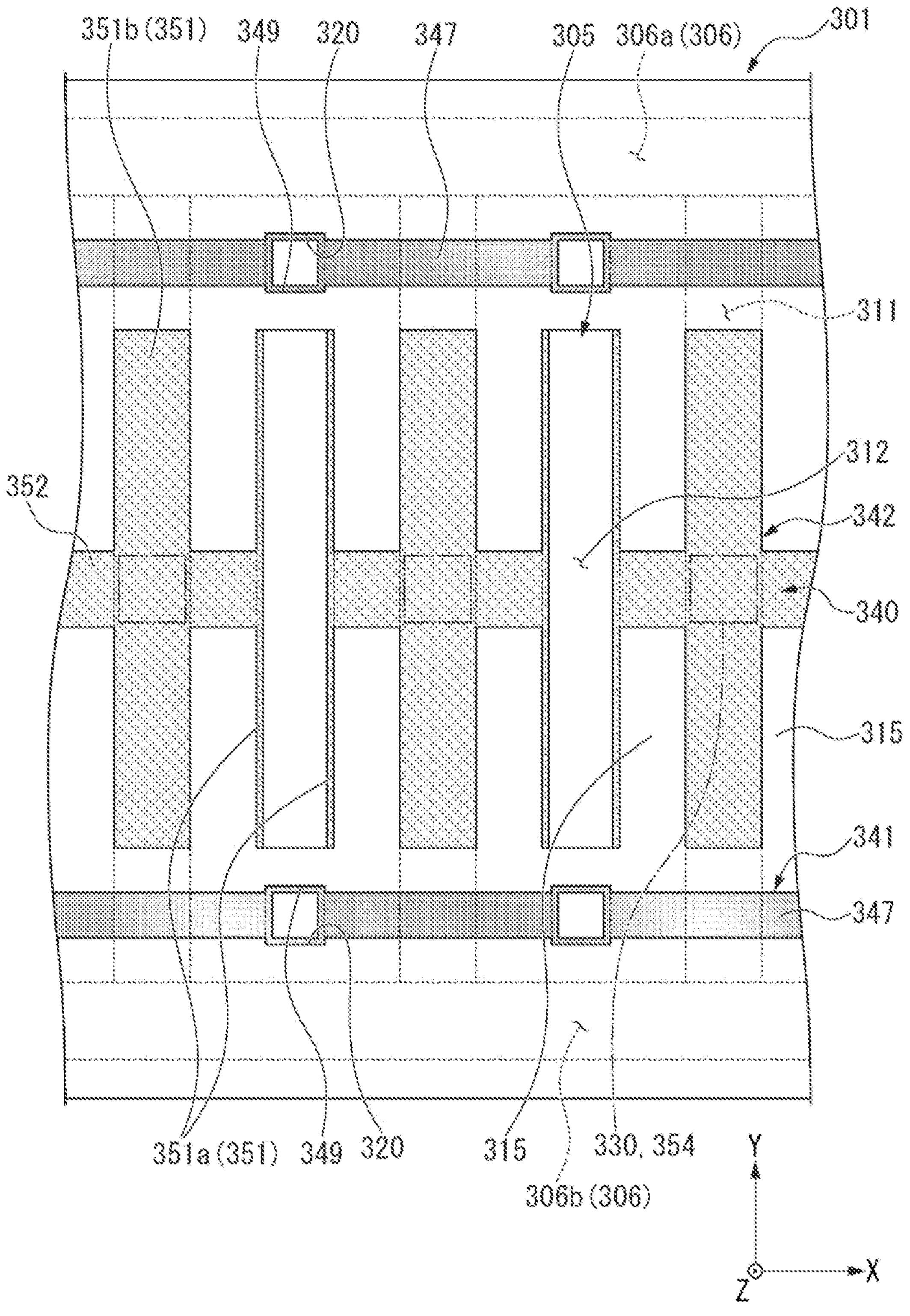
FIG. 24 is a plan view of the actuator plate related to the third embodiment.
Figure 25:
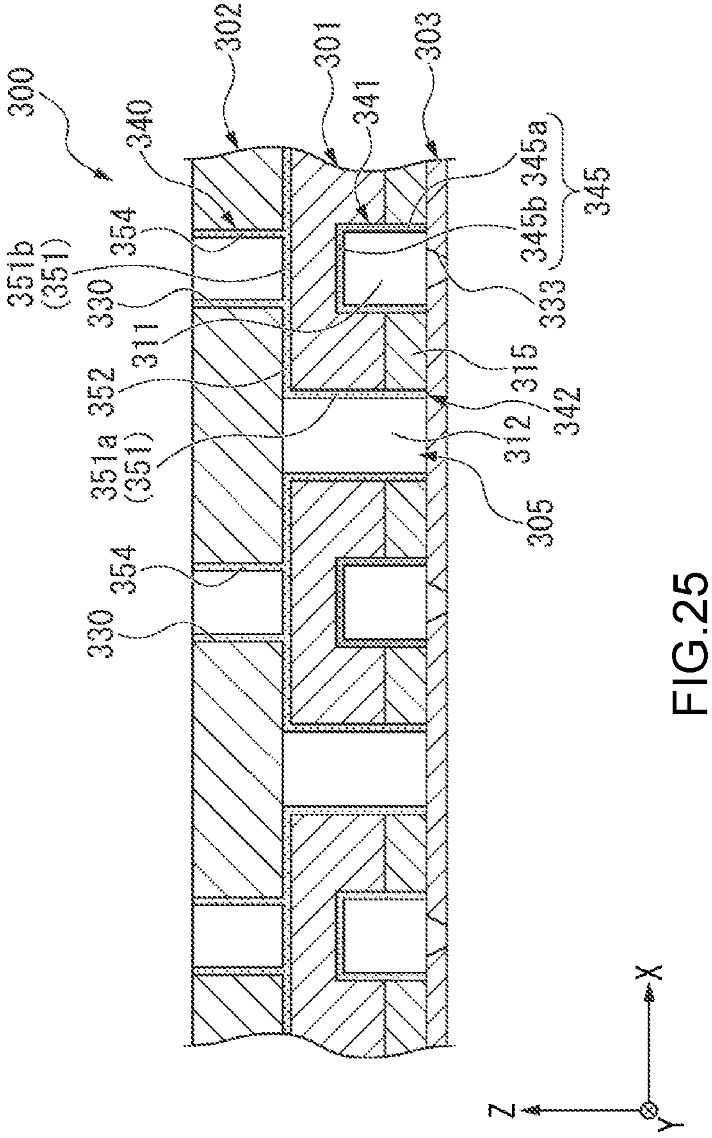
FIG. 25 is a cross-sectional view corresponding to the line XXV-XXV shown in FIG. 21.

FIG. 23 is a bottom view of the actuator plate 301. FIG. 24 is a plan view of the actuator plate 301. FIG. 25 is a cross-sectional view corresponding to the line XXV-XXV shown in FIG. 21.

As shown in FIG. 21 through FIG. 25, the drive interconnections 340 consist of common interconnections 341 and individual interconnections 342. The common interconnections 341 are provided with common electrodes 345, lower-surface coupling interconnections 346, upper-surface coupling interconnections 347, common terminals 348, and through interconnections 349.

As shown in FIG. 21 and FIG. 25, the common electrode 345 is formed on inner surfaces of the ejection channel 311. The common electrode 345 is provided with side-surface electrodes 345*a* and a bottom-surface electrode 345*b*.

The side-surface electrodes 345*a* are respectively formed on inner side surfaces opposed to each other in the X direction out of the inner surfaces of the ejection channel 311. The side-surface electrodes 345*a* are each formed throughout the entire area of corresponding one of the inner side surfaces.

The bottom-surface electrode 345*b* is formed in the entire area of the bottom surface (a surface facing downward) of each of the ejection channels 311. The bottom-surface electrode 345*b* is connected integrally to the side-surface electrodes 345*a* provided to the same ejection channel 311.

As shown in FIG. 23, the lower-surface coupling interconnections 346 are formed on the actuator plate 301 at both sides in the Y direction with respect to the lower end opening part of the non-ejection channel 312. The lower-surface coupling interconnections 346 extend in the X direction so as to traverse the common interconnecting first holes 320 and the ejection channels 311. The lower-surface coupling interconnections 346 are each coupled to the common electrodes 345 (the side-surface electrodes 345*a*) at a lower end opening edge of each of the ejection channels 311.

As shown in FIG. 24, the upper-surface coupling interconnections 347 are formed on the upper surface of the actuator plate 301 at positions overlapping the lower-surface coupling interconnections 346 in the plan view. The upper-surface coupling interconnections 347 extend in the X direction so as to traverse the common interconnecting first holes 320.

As shown in FIG. 22, the common terminals 348 are respectively formed on an upper surface of the cover plate 302 in both end portions in the Y direction. An outer side end edge in the Y direction in the common terminal 348 reaches an upper end opening edge of the common interconnecting second hole 331.

The through interconnection 349 is formed on inner surfaces of the common interconnecting first hole 320 and the common interconnecting second hole 331. The through interconnection 349 is coupled to the lower-surface coupling interconnection 346 at a lower end opening edge of the common interconnecting first hole 320. The through interconnection 349 is coupled to the upper-surface coupling interconnection 347 at an upper end opening edge of the common interconnecting first hole 320. The through interconnection 349 is coupled to the common terminal 348 at an upper end opening edge of the common interconnecting second hole 331.

As shown in FIG. 21 through FIG. 25, the individual interconnection 342 is provided with an individual electrode 351, a coupling interconnection 352, an individual terminal 353, and a through interconnection 354.

The individual electrode 351 includes first individual electrodes 351*a* and a second individual electrode 351*b*.

As shown in FIG. 22, the first individual electrodes 351*a* are respectively formed on the inner side surfaces opposed to each other in the X direction out of inner surfaces of the non-ejection channels 312. The first individual interconnections 351*a* are each formed throughout the entire area of the inner side surface of the non-ejection channel 312.

As shown in FIG. 21 and FIG. 24, the second individual electrode 351*b* is formed on the upper surface (an opposite surface) of the actuator plate 301 in a portion overlapping the ejection channel 311 in the plan view. The second individual electrode 351*b* linearly extends in the Y direction along the ejection channel 311.

The coupling interconnection 352 couples the first individual electrodes 351*a* and the second individual electrode 351*b* to each other on the upper surface of the actuator plate 301. The coupling interconnection 352 extends in the X direction on the upper surface of the actuator plate 301 in a central portion in the Y direction. The coupling interconnection 352 couples the first individual electrodes 351*a* to each other, the first individual electrodes 351*a* being opposed in the X direction to each other across one ejection channel 311, at an upper end opening edge of the non-ejection channel 312. Meanwhile, the coupling interconnection 352 is coupled to the second individual electrode 351*b* on the upper surface of the actuator plate 301.

As shown in FIG. 21, a plurality of the individual terminals 353 is formed on the upper surface of the cover plate 302 so as to correspond to the individual electrodes 351.

The through interconnection 354 couples the individual terminal 353 and the second individual electrode 351*b* to each other through the individual interconnecting hole 330 provided to the cover plate 302. The individual interconnecting hole 330 penetrates a portion of the cover plate 302 in the Z direction, the portion overlapping the second individual electrode 351*b* in the plan view. The through interconnection 354 is formed throughout the entire area of an inner surface of the individual interconnecting hole 330. The through interconnection 354 is coupled to the second individual electrode 351*b* at a lower end opening edge of the individual interconnecting hole 330. The through interconnection 354 is coupled to the individual terminal 353 at an upper end opening edge of the individual interconnecting hole 330.

Also in the third embodiment, when ejecting the ink, by generating the potential difference in the X direction between the side-surface electrode 345*a* and the first individual electrode 351*a*, it is possible to deform the actuator plate 301 (the drive walls 315) in the X direction in the shear mode. Further, by generating the potential difference in the Z direction between the bottom-surface electrode 345*b* and the second individual electrode 351*b*, it is possible to deform the actuator plate 301 in the Z direction in the bend mode.

On that basis, it is possible to generate the potential difference between the portion of the first individual electrode 351*a*, the portion being located above the bottom surface of the ejection channel 311, and the bottom-surface electrode 345*b*. Therefore, it is possible to deform the actuator plate 301 in a direction in which the volume of the ejection channel 311 increases in the shear mode and the bend mode.

As described above, by deforming the actuator plate 301 in both of the X direction and the Z direction, it is easy to ensure the elastic energy of the actuator plate 301 when applying the voltage. Therefore, it is easy to ensure the pressure to be generated in the ejection channel 311 when ejecting the ink, and it is possible to obtain the desired ejection performance.

(First Modified Example)

In the third embodiment, there is described when forming the common interconnecting holes 320, 331 so as to correspond to the ejection channels 311, but this configuration is not a limitation.

Figure 26:
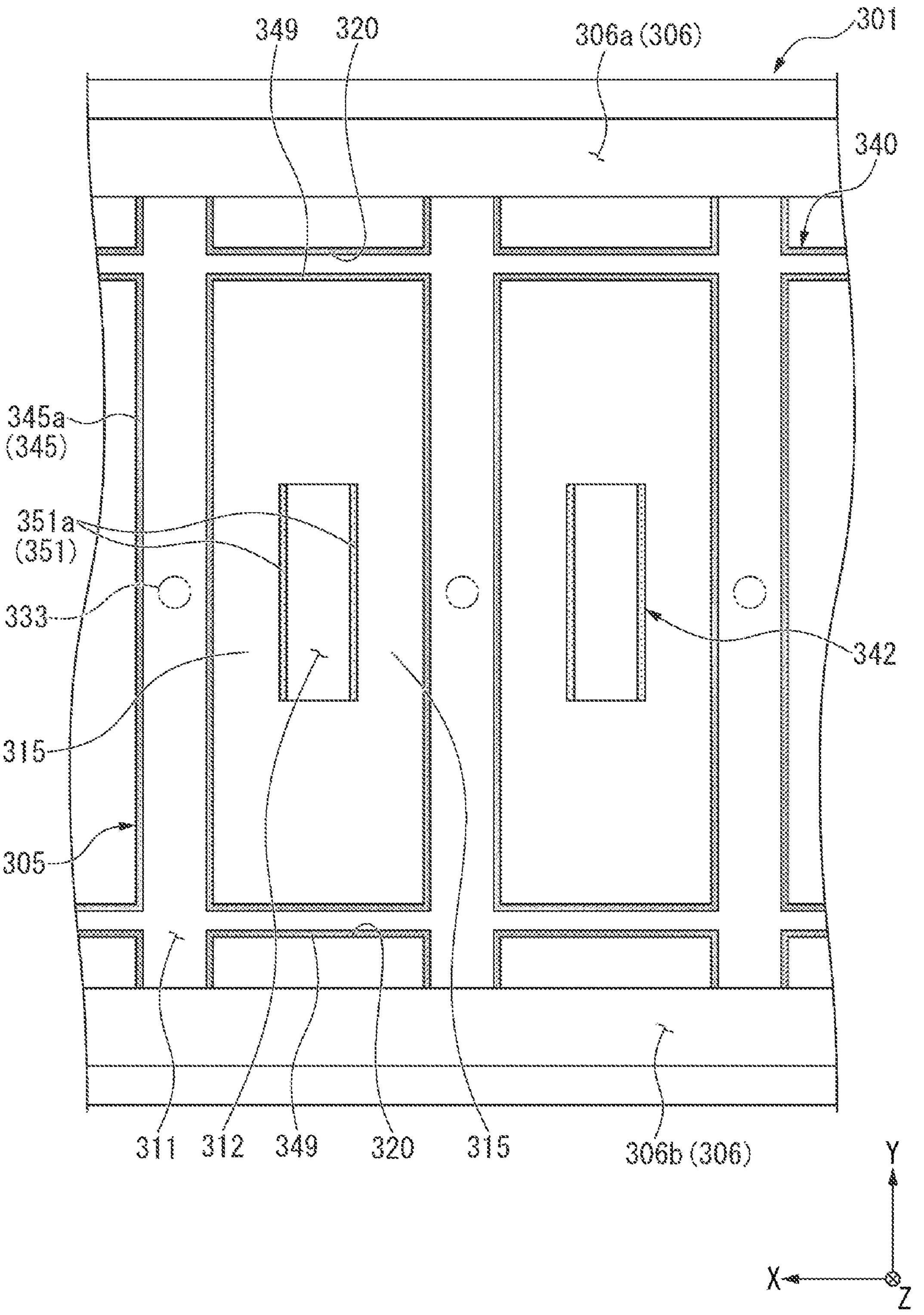
FIG. 26 is a bottom view of an actuator plate related to a first modified example.
Figure 27:
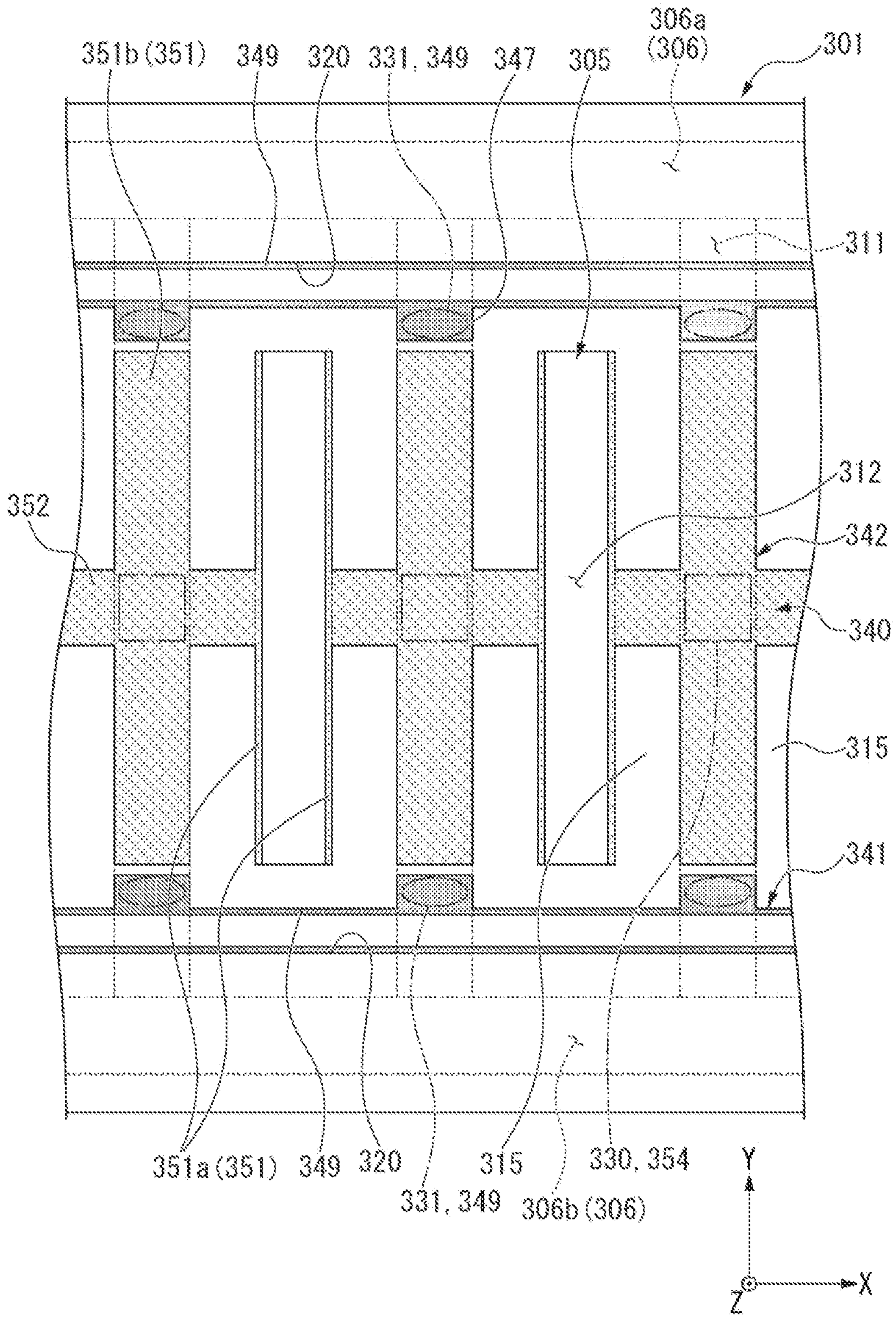
FIG. 27 is a plan view of the actuator plate related to the first modified example.

As shown in, for example, FIG. 26 and FIG. 27, it is possible to form the common interconnecting first hole 320 in a lump in a portion of the actuator plate 301, the portion being located at an outer side in the Y direction with respect to the channel array 305. In the illustrated example, the common interconnecting first hole 320 extends in the X direction so as to traverse the channel array 305. In this case, the upper-surface coupling interconnection 347 is formed in a portion of the upper surface of the actuator plate 301, the portion overlapping the ejection channel 311 in the plan view, and being located at an outer side in the Y direction with respect to the second individual electrode 351*b*. The upper-surface coupling interconnection 347 is coupled to the through interconnection 349 at the upper end opening edge of the common interconnecting first hole 320.

According to this configuration, it is possible to achieve an increase in manufacturing efficiency compared to when individually forming the common interconnecting first hole 320 for each of the ejection channels 311, and therefore, it is possible to achieve a reduction in cost and an increase in yield ratio. Further, unlike when individually forming the common interconnecting first hole 320 for each of the ejection channels 311, it is also possible to prevent a crack or the like from occurring in a portion of the actuator plate 301, the portion being located between the common interconnecting first holes 320 adjacent to each other.

(Second Modified Example)

Figure 28:
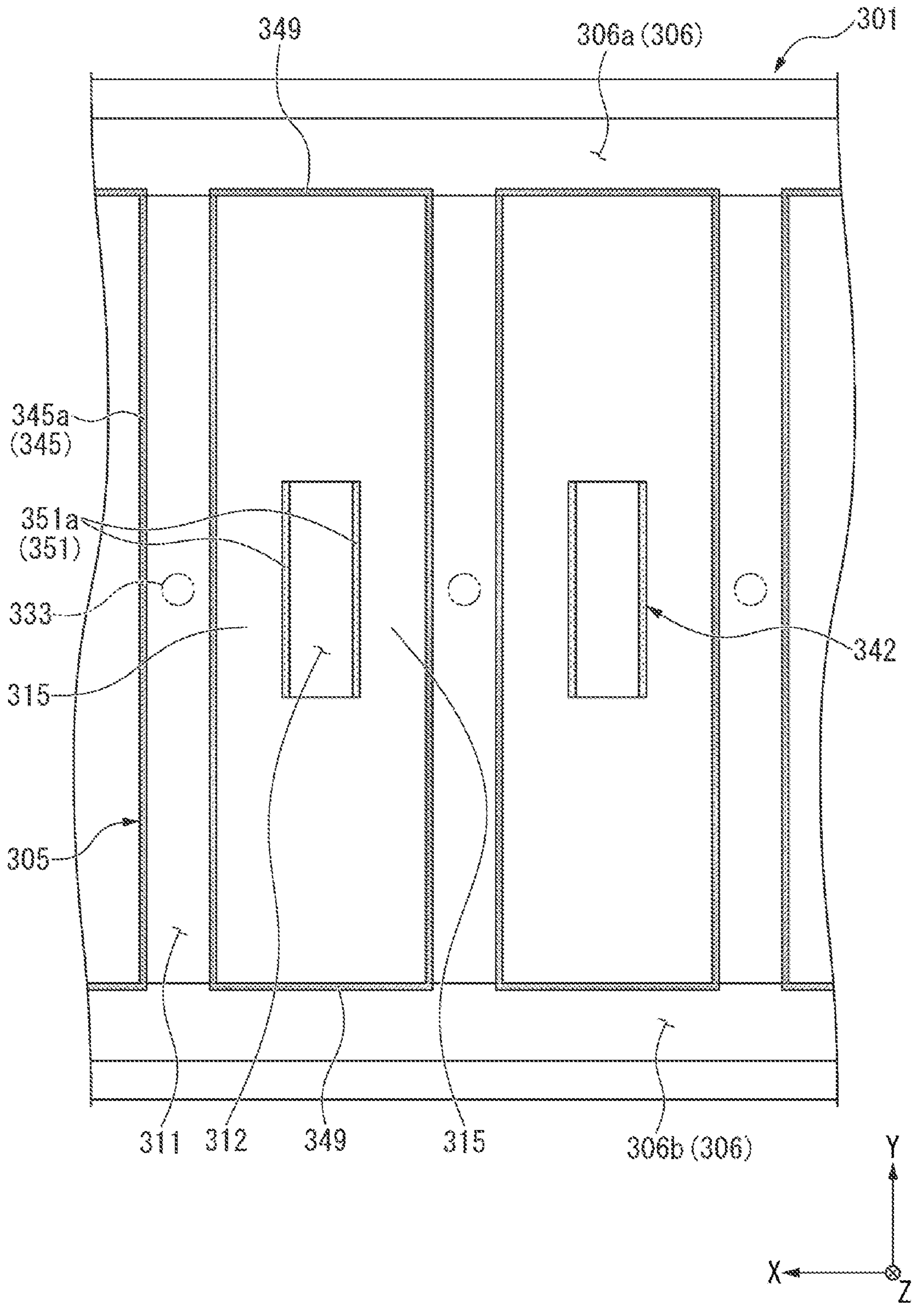
FIG. 28 is a bottom view of an actuator plate related to a second modified example.
Figure 29:
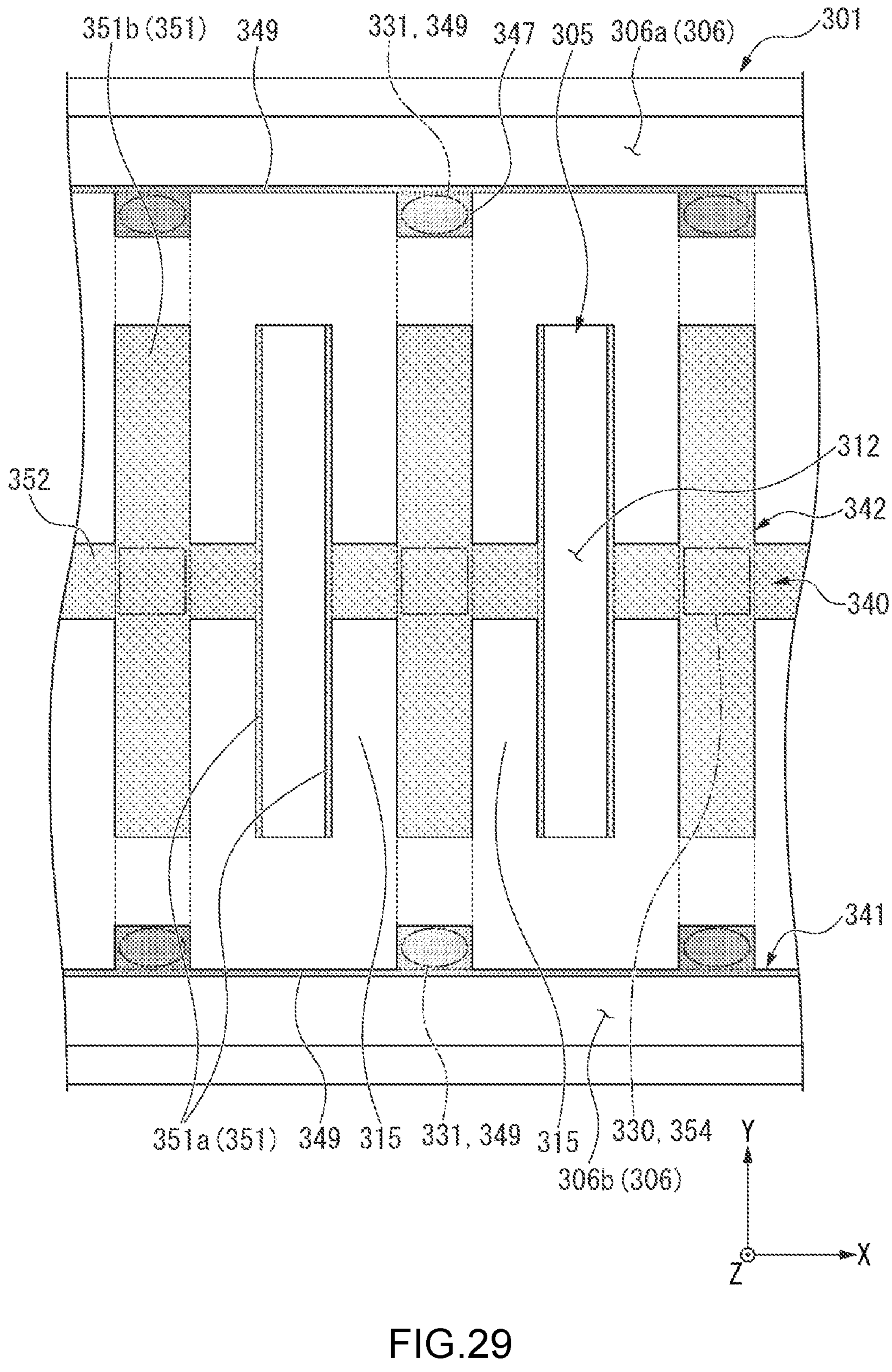
FIG. 29 is a plan view of the actuator plate related to the second modified example.

As in the head chip 300 shown in FIG. 28 and FIG. 29, it is possible to form the through interconnections 349 on inner surfaces of the common flow channels 306*a*, 306*b*. In the illustrated example, the through interconnections 349 are each formed throughout the entire area of a surface facing outward in the Y direction out of corresponding one of the inner surfaces of the common flow channels 306*a*, 306*b*. Further, in the present modified example, the common flow channels 306*a*, 306*b* penetrate the actuator plate 301 in the Z direction. Therefore, the through interconnection 349 is coupled to the outer side end edge in the Y direction in the upper-surface coupling interconnection 347 at the upper end opening edges of the common flow channels 306*a*, 306*b*.

It should be noted that it is preferable for the through interconnection 349 to be covered with a protective film having an insulating property. It is preferable to use an organic insulating material such as a para-xylylene resin material (e.g., parylene (a registered trademark)) as the protective film. It should be noted that the protective film can be formed of tantalum oxide ($Ta_2O_5$), silicon nitride (SiN), silicon carbide (SiC), silicon oxide ($SiO_2$), diamond-like carbon, or the like, or can include at least any one of these materials.

According to this configuration, since there is no need to separately form the common interconnecting first holes 320, it is possible to achieve an increase in manufacturing efficiency. As a result, it is possible to achieve the reduction in cost and the increase in yield ratio.

Further, it is possible to achieve a reduction in size in the Y direction in the head chip 300 compared to when separately forming the common interconnecting first holes 320.

(Other Modified Examples)

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet heads move with respect to the recording target medium when performing printing as an example, but this configuration is not a limitation. The configuration related to the present disclosure can be adopted as the configuration (a so-called stationary head machine) in which the recording target medium is moved with respect to the inkjet heads in the state in which the inkjet heads are fixed.

In the embodiments described above, there is explained when the recording target medium P is paper, but this configuration is not a limitation. The recording target medium P is not limited to paper, but can also be a metal material or a resin material, and can also be food or the like.

In the embodiments described above, there is explained the configuration in which the liquid jet heads are installed in the liquid jet recording device, but this configuration is not a limitation. Specifically, the liquid to be jetted from the liquid jet heads is not limited to what is landed on the recording target medium, but can also be, for example, a medical solution to be blended during a dispensing process, a food additive such as seasoning or a spice to be added to food, or fragrance to be sprayed in the air.

In the embodiments described above, there is explained the configuration in which the Z direction coincides with the gravitational direction, but this configuration is not a limitation, and it is also possible to set the Z direction to a direction along the horizontal direction.

In the embodiments described above, there is explained the configuration (so-called pulling-shoot) of deforming the actuator plate in the direction of increasing the volume of the ejection channel due to the application of the drive voltage, and then restoring the actuator plate to thereby eject the ink, but this configuration is not a limitation. It is possible for the head chip according to the present disclosure to be provided with a configuration (so-called pushing-shoot) in which the ink is ejected by deforming the actuator plate in a direction of reducing the volume of the ejection channel due to the application of the voltage. When performing the pushing-shoot, the actuator plate deforms so as to bulge toward the inside of the ejection channel due to the application of the drive voltage. Thus, the volume in the ejection channel decreases to increase the pressure in the ejection channel, and thus, the ink located in the ejection channel is ejected outside through the nozzle hole. When setting the drive voltage to zero, the actuator plate is restored. As a result, the volume in the ejection channel is restored.

In the embodiments described above, there is explained the configuration in which the dimension of the first individual electrode is larger than the dimension of the side-surface electrode in the thickness direction of the actuator plate, but this configuration is not a limitation. It is possible to make the first individual electrode and the side-surface electrode equivalent in dimension to each other.

In the embodiments described above, there is explained the configuration in which the first individual electrode and the second individual electrode are coupled to each other with the coupling interconnection, but this configuration is not a limitation. It is possible to separately couple the first individual electrode and the second individual electrode to an external interconnection.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

an actuator plate in which jet channels and non-jet channels opening at a first side in a thickness direction and extending in a first direction crossing the thickness direction are alternately arranged in a second direction crossing the first direction when viewed from the thickness direction;

a side-surface common electrode formed on inner side surfaces opposed to each other in the second direction out of inner surfaces of the jet channel;

a bottom-surface common electrode formed on a bottom surface facing to the first side in the thickness direction out of the inner surfaces of the jet channel;

a first individual electrode which is formed on inner side surfaces opposed to each other in the second direction out of inner surfaces of the non-jet channel, and which is configured to generate a potential difference from the side-surface common electrode; and a second individual electrode which is disposed on an opposite surface facing to a second side in the thickness direction out of the actuator plate, and which is configured to generate a potential difference from the bottom-surface common electrode.

2. The head chip according to claim 1, wherein the non-jet channel penetrates the actuator plate in the thickness direction, and the first individual electrode is formed throughout an entire area in the thickness direction on the inner side surfaces of the non-jet channel.

3. The head chip according to claim 2, wherein a coupling interconnection configured to couple the first individual electrode and the second individual electrode to each other is formed on the opposite surface.

4. The head chip according to claim 1, wherein a jet hole plate having jet holes respectively communicated with the jet channels is overlapped on a first side end surface in the first direction in the actuator plate.

5. The head chip according to claim 1, wherein a cover plate having an entrance flow channel communicated with the jet channel in a first side end portion in the first direction, and an exit flow channel communicated with the jet channel in a second side end portion in the first direction is disposed at the second side in the thickness direction with respect to the actuator plate, and a jet hole plate provided with a jet hole communicated with the jet channel is disposed at the first side in the thickness direction with respect to the actuator plate.

6. A liquid jet head comprising:

the head chip according to claim 1.

7. A liquid jet recording device comprising:

the liquid jet head according to claim 6.

* * * * *